United States Patent
Saisho et al.

(10) Patent No.: US 7,616,364 B2
(45) Date of Patent: Nov. 10, 2009

(54) SCANNING OPTICAL SYSTEM, OPTICAL SCANNER, AND IMAGE FORMING APPARATUS HAVING A BICONVEX LENS HAVING A CHANGE OF CURVATURE OF THE TORIC SURFACE IN THE CROSS SECTION IN THE SUB-SCANNING DIRECTION ALONG THE MAIN SCANNING DIRECTION IS ASYMMETRIC WITH AN OPTICAL AXIS OF THE LENS

(75) Inventors: Kenichiroh Saisho, Kanagawa (JP); Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/340,646

(22) Filed: Jan. 27, 2006

(65) Prior Publication Data
US 2006/0187294 A1    Aug. 24, 2006

(30) Foreign Application Priority Data

| Feb. 21, 2005 | (JP) | ............................. 2005-044661 |
| Mar. 28, 2005 | (JP) | ............................. 2005-091795 |
| May 11, 2005  | (JP) | ............................. 2005-138243 |

(51) Int. Cl.
*G02B 26/08* (2006.01)
(52) U.S. Cl. ................. 359/207.1; 359/207.6
(58) Field of Classification Search ......... 359/205–207, 359/205.1–207.11, 207.6
See application file for complete search history.

(56) References Cited

U.S. PATENT DOCUMENTS 5,305,022 A * 4/1994 Ota et al. ..................... 347/233
5,377,038 A * 12/1994 Uzuki et al. ................. 359/205

(Continued)

FOREIGN PATENT DOCUMENTS

JP            10-253915          9/1998

(Continued)

OTHER PUBLICATIONS

U.S. Appl. No. 11/740,070, filed Apr. 25, 2007, Sakai, et al.

(Continued)

*Primary Examiner*—Stephone B Allen
*Assistant Examiner*—Jennifer L Doak
(74) *Attorney, Agent, or Firm*—Oblon, Spivak, McClelland, Maier & Neustadt, L.L.P.

(57) ABSTRACT

A scanning optical system includes converges, with a single lens, a divergent luminous flux, which is deflected in a main scanning direction by an optical deflector, on a surface of a scan target. The lens has two surfaces in a biconvex shape in both the main scanning direction and a sub-scanning direction, and at least one of the surfaces is a toric surface in which a line that connects, on a cross section in the main scanning direction, centers of curvature in a cross section in the sub-scanning direction is nonlinear, and change of the curvature of the toric surface in the cross section in the sub-scanning direction along the main scanning direction is asymmetric with an optical axis of the lens. The surfaces are anamorphic surfaces.

12 Claims, 15 Drawing Sheets

U.S. PATENT DOCUMENTS

| | | | |
|---|---|---|---|
| 5,768,028 A * | 6/1998 | Okamura | 359/206 |
| 6,104,522 A * | 8/2000 | Hayashi et al. | 359/207 |
| 2003/0090563 A1* | 5/2003 | Tomita et al. | 347/245 |
| 2004/0090658 A1* | 5/2004 | Takakubo | 359/205 |

FOREIGN PATENT DOCUMENTS

| | | |
|---|---|---|
| JP | 2002-90677 | 3/2002 |
| JP | 2003295080 A * | 10/2003 |
| JP | 2005-44661 | 2/2005 |

OTHER PUBLICATIONS

U.S. Appl. No. 11/782,268, filed Jul. 24, 2006, Ichii, et al.
U.S. Appl. No. 11/844,643, filed Aug. 24, 2007, Saisho, et al.
U.S. Appl. No. 11/850,401, filed Sep. 5, 2007, Saisho, et al.
U.S. Appl. No. 11/857,811, filed Sep. 19, 2007, Hayashi, et al.
U.S. Appl. No. 12/174,899, filed Jul. 17, 2008, Saisho, et al.
U.S. Appl. No. 12/189,430, filed Aug. 11, 2008, Saisho.
U.S. Appl. No. 12/194,902, filed Aug. 19, 2008, Miyatake.
U.S. Appl. No. 12/024,505, filed Feb. 1, 2008, Watanabe, et al.

* cited by examiner

SCANNING OPTICAL SYSTEM, OPTICAL SCANNER, AND IMAGE FORMING APPARATUS HAVING A BICONVEX LENS HAVING A CHANGE OF CURVATURE OF THE TORIC SURFACE IN THE CROSS SECTION IN THE SUB-SCANNING DIRECTION ALONG THE MAIN SCANNING DIRECTION IS ASYMMETRIC WITH AN OPTICAL AXIS OF THE LENS

CROSS-REFERENCE TO RELATED APPLICATIONS

The present document incorporates by reference the entire contents of Japanese priority documents, 2005-044661 filed in Japan on Feb. 21, 2005, 2005-091795 filed in Japan on Mar. 28, 2005 and 2005-138243 filed in Japan on May 11, 2005.

BACKGROUND OF THE INVENTION

1. Field of the Invention

The present invention relates to a scanning optical system, an optical scanner, an image forming apparatus, and a color image forming apparatus.

2. Description of the Related Art

An optical scanner is widely used in a digital copying machine, a laser printer or the like. A scanning optical system is an optical system that converges a luminous flux deflected by an optical deflector on a scan target surface as a light spot, and is used in the optical scanner. The scanning optical system is required to have high optical performances including convergence of a luminous flux on an entire scan range of the scan target surface as light spots, highly accurate constant velocity function for scanning the entire scan target surface at constant velocity by the luminous flux deflected at constant angular velocity, and satisfactory corrections of various aberrations. Conventionally, the scanning optical system of the scanner is normally constituted by a lens system. The number of lenses varies from one to two or more. In terms of cost efficiency, the scanning optical system constituted by one lens is advantageous. However, the scanning optical system constituted by one lens has extremely small in the number of design parameters as compared with a scanning optical system constituted by more than one lens. In addition, if the scanning optical system is constituted by one lens of a simple lens surface shape, it is difficult to ensure satisfactory aberration correction.

There is proposed a technique for ensuring satisfactorily correcting aberrations and constant velocity characteristics by adopting a special lens surface shape even if the scanning optical system is constituted by a single lens (Japanese Patent Application Laid-open (JP-A) Nos. H10-253915 and 2002-90677). The technology disclosed in JP-A No. H10-253915 is characterized as follows. If a direction of a main beam of a deflected luminous flux, when the main beam is orthogonal to a scan target surface, is assumed as a reference direction X, an angle θ1 of the main beam of the deflected luminous flux directed toward one end A of an effective write area with respect to the reference direction X differs from an angle θ2 of the main beam of the deflected light beam directed toward the other end B of the effective write area with respect to the reference direction X. In addition, at least one scan imaging element is shifted or tilted from the reference direction X so as to lessen the influence of sag. The technology disclosed in JP-A No. 2002-90677 is characterized by setting a paraxial radius of curvature within a main scanning plane, an aspherical amount, a distance to a scan target surface, and the like of a single lens that constitutes a scan imaging element to satisfy predetermined conditions.

Recently, there is a strong demand for improving a scan density of the optical scanner. To meet this demand, reduction of a diameter of a light spot and stabilization of the light spot are required. However, to do so, it is insufficient to correct a geometric optical aberration but it is important and necessary to correct a wave optical aberration. The technologies disclosed in JP-A Nos. H10-253915 and 2002-90677 does not refer to correction of such a wave optical aberration.

It is also required to scale down the optical scanner. The scale down of the optical scanner includes a reduction in a size of the scanner and a reduction in a thickness of the lens. However, if the optical scanner is scaled down while maintaining its performances, a tolerance is narrowed so as to increase magnification is imposed on the optical scanner. Accordingly, it is desired to realize a scanning optical system capable of ensuring high performances with a shape as simple as possible.

SUMMARY OF THE INVENTION

It is an object of the present invention to at least solve the problems in the conventional technology.

A scanning optical system according to one aspect of the present invention converges, with a single lens, a divergent luminous flux, which is deflected in a main scanning direction by an optical deflector, on a surface of a scan target. The scanning optical system includes a lens configured to have two surfaces in a biconvex shape in both the main scanning direction and a sub-scanning direction. At least one of the surfaces is a toric surface in which a line that connects, on a cross section in the main scanning direction, centers of curvature in a cross section in the sub-scanning direction is nonlinear, and a change of the curvature of the toric surface in the cross section in the sub-scanning direction along the main scanning direction is asymmetric with an optical axis of the lens.

A scanning optical system according to another aspect of the present invention converges, with a single lens, a divergent luminous flux, which is deflected in a main scanning direction by an optical deflector, on a surface of a scan target. The scanning optical system includes a lens configured to have two surfaces in a biconvex shape in both the main scanning direction and a sub-scanning direction. The surfaces are anamorphic surfaces.

A scanning optical system according to still another aspect of the present invention converges, with a single lens, a divergent luminous flux, which is deflected in a main scanning direction by an optical deflector, on a surface of a scan target. The scanning optical system includes a lens configured to have two surfaces in a biconvex shape in both the main scanning direction and a sub-scanning direction. One of the surfaces that is closer to the optical deflector is a constant curvature surface in which curvature in the cross section in the sub-scanning direction is constant along the main scanning direction.

A scanning optical system according to still another aspect of the present invention converges, with a single lens, a divergent luminous flux, which is deflected in a main scanning direction by an optical deflector, on a surface of a scan target. The scanning optical system satisfies $|R1|>|R2|$ and $|r1|>|r2|$, where a radius of curvature of a first surface of the lens in the main scanning direction is R1, a radius of curvature of a second surface of the lens in the main scanning direction is R2, a radius of curvature of the first surface in the sub-scanning direction is r1, and a radius of curvature of the second surface in the sub-scanning direction is r2, and one of the surfaces that is closer to the optical deflector is a constant curvature surface in which curvature in the cross section in the sub-scanning direction is constant along the main scanning direction.

A scanning optical system according to still another aspect of the present invention converges, with a single lens, a divergent luminous flux, which is deflected in a main scanning direction by an optical deflector, on a surface of a scan target. The scanning optical system satisfies 4.5<L/d0<7.5, where a distance from a reflection point on a reflective surface of the optical deflector to an incident surface of the lens is d0 and a distance from an emission surface of the lens to the surface of the scan target is L, the scanning optical system satisfies |R1|>|R2| and |r1|>|r2|, where a radius of curvature of a first surface of the lens in the main scanning direction is R1, a radius of curvature of a second surface of the lens in the main scanning direction is R2, a radius of curvature of the first surface in the sub-scanning direction is r1, and a radius of curvature of the second surface in the sub-scanning direction is r2, and at least one of the surfaces of the lens is an anamorphic surface.

A single-beam optical scanner according to still another aspect of the present invention includes a light source configured to emit a luminous flux; a coupling lens configured to couple the luminous flux with a subsequent optical system; an optical deflector configured to deflect the luminous flux at a constant angular velocity; a line imaging optical system configured to image coupled luminous flux near a reflective surface of the optical deflector as a line image that is long in a main scanning direction; and the scanning optical system according to the above aspects.

A multi-beam optical scanner according to still another aspect of the present invention includes a plurality of light sources configured to emit luminous fluxes; a coupling lens configured to couple the luminous fluxes with a subsequent optical system; an optical deflector configured to simultaneously deflect the luminous fluxes at a substantially constant angular velocity; a common line imaging optical system configured to image the coupled luminous fluxes near a reflective surface of an optical deflector by as a plurality of line images that are long in a main scanning direction and that are separated in a sub-scanning direction; and the scanning optical system according to the above aspects.

An image forming apparatus according to still another aspect of the present invention includes a photosensitive image carrier; an optical scanner configured to optically scan the photosensitive image carrier to form a latent image; and a development unit configured to develop the latent image. The optical scanner is the optical scanner according to the above aspects.

A color image forming apparatus according to still another aspect of the present invention includes a plurality of photosensitive image carriers; an optical scanner configured to optically scan the photosensitive image carrier to form at least one latent image corresponding to each color; and a development unit configured to develop the latent image. The optical scanner is the optical scanner according to the above aspects.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention are explained in detail below with reference to the accompanying drawings.

Figure 1:
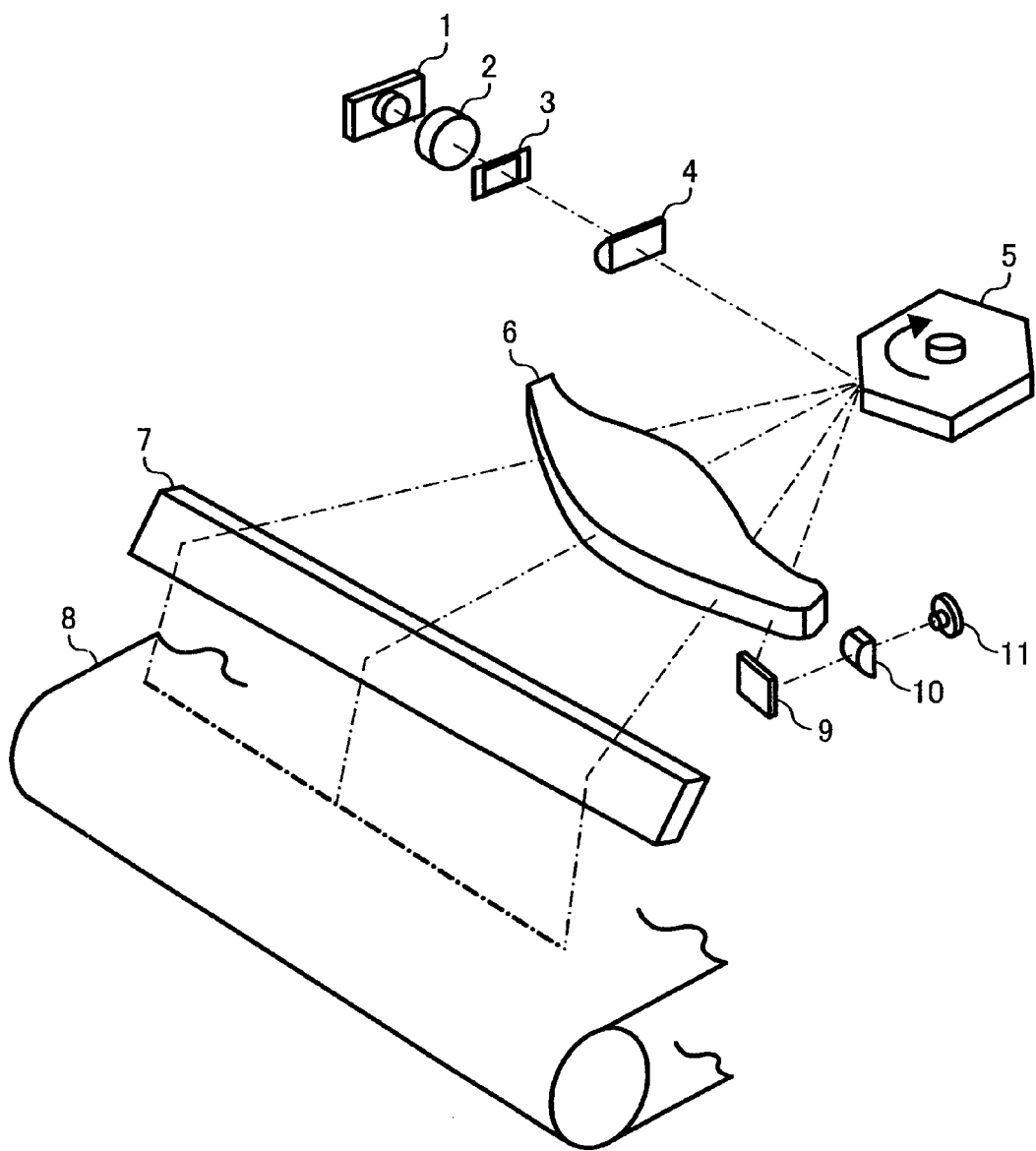
FIG. 1 is a perspective view of a single-beam optical scanner according to an embodiment of the present invention.

FIG. 1 depicts only relevant parts of an optical scanner according to an embodiment of the present invention. This optical scanner is a single-beam optical scanner. A divergent luminous flux emitted from a light source 1, which is a semiconductor laser, is transformed into a luminous flux having lower divergence by a coupling lens 2.

While the luminous flux transmitted through the coupling lens 2 is caused to pass through an opening of an aperture 3, peripheries of the luminous flux are cut off to form a beam to enter a cylindrical lens 4, which is a line imaging optical system. The cylindrical lens 4 orients a powerless direction to a main scanning direction and converges the incident luminous flux having positive power only in a sub-scanning direction, and converges the luminous flux near a deflecting and reflecting surface of a polygon mirror 5, which is an optical deflector, as a line image that is long in the main scanning direction.

The luminous flux reflected by of the polygon mirror 5 is deflected at constant angular velocity to follow rotation of the polygon mirror 5 at constant velocity to be transmitted through a lens 6. An optical path of the luminous flux is folded by a folding mirror 7 and converged on a photosensitive element 8, which is a scan target surface, as a light spot, thereby optically scanning the scan target surface.

Before a surface of the photosensitive element 8 is optically scanned, the deflected luminous flux is reflected by a mirror 9 and converged on a light receiving element 11 by an imaging lens 10. In response to reception of the luminous flux, the light receiving element 11 outputs a signal. Based on output of the signal from the light receiving element 11, write start timing for the optical scan is determined.

The scanning optical system is an optical system that converges the luminous flux deflected by the optical deflector 5 on the scan target surface, such as the photosensitive element 8, as a light spot. The scanning optical system is constituted by a single lens of the lens 6 in the embodiment as shown in FIG. 1. The lens 6 is biconvex in both the main scanning direction and the sub-scanning direction. In this embodiment, the lens 6 is an anamorphic optical system that functions to cause a region near the deflecting and reflecting surface of the polygon mirror 5 and the surface of the photosensitive element 8, to have a geometric optical conjugate relationship in the sub-scanning direction.

As the lens or scanning optical system 6, one that satisfies the following condition (1) is employed. It is assumed herein that a distance from a reflection point on the deflecting and reflecting surface of the polygon mirror 5, which is the optical deflector, to an incident surface of the lens 6 is d0. It is also assumed that a distance from an emission surface of the lens 6 to the surface of the photosensitive element 8, which is the scan target surface, is L.

$$4.5 < L/d0 < 7.5 \quad (1)$$

In this embodiment, one surface of the lens 6 is a constant curvature surface and the other surface thereof is a special toric lens surface. On the special toric lens surface, a change in curvature in a sub-scanning cross section along the main scanning direction is asymmetric about an optical axis. Furthermore, as the scanning optical system 6, one that satisfies the following conditions (2) and (3) is employed. It is assumed herein that a radius of curvature of a first surface of the scanning optical system 6 in the main scanning direction is R1, that of a second surface thereof in the main scanning direction is R2, that of the first surface in the sub-scanning direction is r1, and that of the second surface in the sub-scanning direction is r2.

$$|R1| > |R2| \quad (2)$$

$$|r1| > |r2| \quad (3)$$

The single-beam optical scanner shown in FIG. 1 is configured as follows. The luminous flux from the light source 1 is coupled with the subsequent optical system by the coupling lens 2. The coupled luminous flux is imaged as a line image, which is long in the main scanning direction, near the deflecting and reflecting surface of the polygon mirror or optical deflector 5 by the cylindrical lens or line imaging optical system 4, and deflected at constant angular velocity by the optical deflector 5. In addition, the deflected luminous flux is converged on the surface of the photosensitive element 8 or scan target surface as a light spot by the lens or scanning optical system 6, thereby optically scanning the scan target surface 8. As the scanning optical system 6, a scanning optical system according to any one of claims 1 to 41 is employed.

Figure 2:
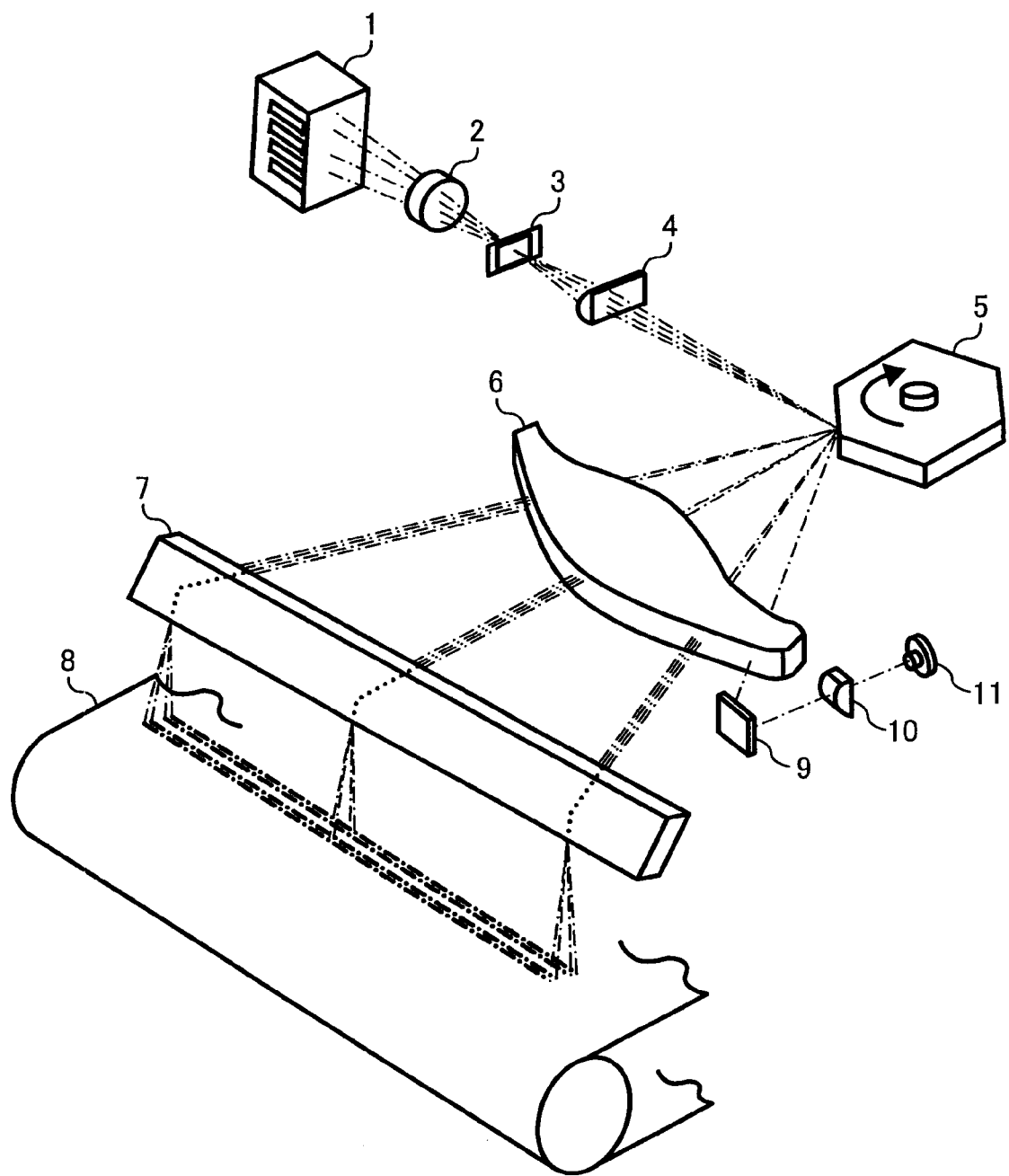
FIG. 2 is a perspective view of a multi-beam optical scanner according to another embodiment of the present invention.

FIG. 2 depicts an optical scanner according to another embodiment of the present invention. The optical scanner shown in FIG. 2 is a multi-beam optical scanner. In FIG. 2, to avoid complexity, like reference numerals as those shown in FIG. 1 are used to designate like constituent elements as those shown in FIG. 1. In FIG. 2, the light source 1 is constituted by a semiconductor laser array in which four light emission sources ch1 to ch4 are aligned equidistantly. In this embodiment, the four light emission sources ch1 to ch4 are arranged in the sub-scanning direction. Needless to say, the light mission sources ch1 to ch4 of the semiconductor laser array can be arranged obliquely relative to the sub-scanning direction. Four luminous fluxes emitted from the four respective light emission sources ch1 to ch4 are divergent luminous fluxes each having a major axis of an elliptic far-field pattern oriented to the main scanning direction. The four luminous fluxes are coupled with a subsequent optical system by the common coupling lens 2. The coupled luminous fluxes can be transformed into luminous fluxes having lower divergence, those having lower convergence, or parallel luminous fluxes according to optical characteristics of the subsequent optical system.

The four-luminous fluxes transmitted by the coupling lens 2 are subjected to beam shaping by the aperture 3, and converged in the sub-scanning direction by an action of the cylindrical lens 4, which serves as a common line imaging optical system. In addition, the four luminous fluxes are imaged as line images, which are long in the main scanning direction, near the deflecting and reflecting surface of the polygon mirror 5, which is the optical deflector, while being separated from one another in the sub-scanning direction. Since the polygon mirror 5 is driven to rotate, the four luminous fluxes are deflected at constant angular velocity by the deflecting and reflecting surface of the polygon mirror 5. The four luminous fluxes thus deflected are transmitted by the single lens 6, which is the scanning optical system. With optical paths of the four luminous fluxes folded by the folding mirror 7, the four luminous fluxes are converged on the surface of the photosensitive element 8, which is substantially the scan target surface, as four light spots separated from one another in the sub-scanning direction. The four scan lines on the scan target surface are thereby simultaneously optically scanned.

Before the surface of the photosensitive element 8 is optically scanned, one of the deflected luminous fluxes is transmitted by the lens 6, reflected by the mirror 9, and converged on the light emitting element 11 by the lens 10. In response to reception of the luminous flux, the light receiving element 11 outputs a detection signal. Based on output of this signal, write start timing for the optical scan is determined.

The scanning optical system is an optical system that converges the four luminous fluxes simultaneously deflected by the polygon mirror or optical deflector 5 on the surface of the photosensitive element 8, which is the scan target surface, as four light spots, respectively. The scanning optical system is constituted by one lens 6. This lens 6 is the same as that explained with reference to FIG. 1 and one that satisfies the following condition (1) is employed as the lens 6. It is assumed herein that a distance from a reflection point on the deflecting and reflecting surface of the optical deflector 5, to the incident surface of the lens 6 is d0. It is also assumed that a distance from the emission surface of the lens 6 to the surface of the photosensitive element 8, which is the scan target surface, is L.

$$4.5 < L/d0 < 7.5 \tag{1}$$

Similarly to the embodiment shown in FIG. 1, one surface of the lens or scanning optical system 6 is a constant curvature surface and the other surface thereof is a special toric lens surface. On the special toric lens surface, a change in curvature in a sub-scanning cross section along the main scanning direction is asymmetric about an optical axis. Furthermore, as the scanning optical system 6, one that satisfies the following conditions (2) and (3) is employed. It is assumed herein that a radius of curvature of a first surface of the scanning optical system 6 in the main scanning direction is R1, that of a second surface thereof in the main scanning direction is R2, that of the first surface in the sub-scanning direction is r1, and that of the second surface in the sub-scanning direction is r2.

$$|R1| > |R2| \tag{2}$$

$$|r1| > |r2| \tag{3}$$

The multi-beam optical scanner shown in FIG. 2 is configured as follows. The luminous fluxes from the light emission sources ch1 to ch4 are coupled with the subsequent optical system by the common coupling lens 2. The coupled luminous fluxes are imaged as line images, which are long in the main scanning direction and separated from one another in the sub-scanning direction, near the deflecting and reflecting surface of the polygon mirror or optical deflector 5 by the cylindrical lens as a common line imaging optical system 4. The luminous fluxes are simultaneously deflected by the optical deflector 5 at constant angular velocity. The deflected luminous fluxes are converged, as a plurality of light spots separated from one another in the sub-scanning direction, on the surface of the photosensitive element 8 or scan target surface by the common scanning optical system 6, thereby optically scanning a plurality of scan lines on the scan target surface 8 by these light spots. As the common scanning optical system common, the lens 6 equal in configuration to a lens used in a scanning optical system according to claim 42 is employed. As the light source 1, a monolithic semiconductor laser array in which the light emission sources ch1 to ch4 are aligned is employed.

In this specification, "a spot diameter of a light spot" is defined by an intensity $1/e^2$ in line spread functions of a light intensity distribution for the light spot on the scan target surface. The line spread functions includes a line spread function for a Z direction LSZ and a line spread function for a Y direction LSY. When a light intensity distribution f(Y, Z) of the light spot is expressed by coordinates Y and Z in the main scanning direction and the sub-scanning direction, respectively based on coordinates of a center of the light spot formed on the scan target surface, the LSZ and LSY are defined as follows.

LSZ (Z)=∫f(Y, Z)dY (integration is performed for all widths of the light spot in the Y direction)

LSY(Y)=∫f(Y, Z)dZ (integration is performed for all widths of the light spot in the Z direction)

Normally, these line spread functions LSZ(Z) and LSY(Y) are generally Gaussian distribution functions. Spot diameters in the Y and the Z directions are determined by Y and Z direction widths of an area in which each of the LSZ(Z) and the LSY(Y) is equal to or greater than maximum $1/e^2$, respectively.

The spot diameters thus defined by the respective line spread functions can be easily measured by optically scanning the light spot along a slit at constant velocity, receiving the light transmitted by the slit by an optical detector, and integrating a quantity of received light. A device that measures the spot diameters is commercially available.

Figure 3:
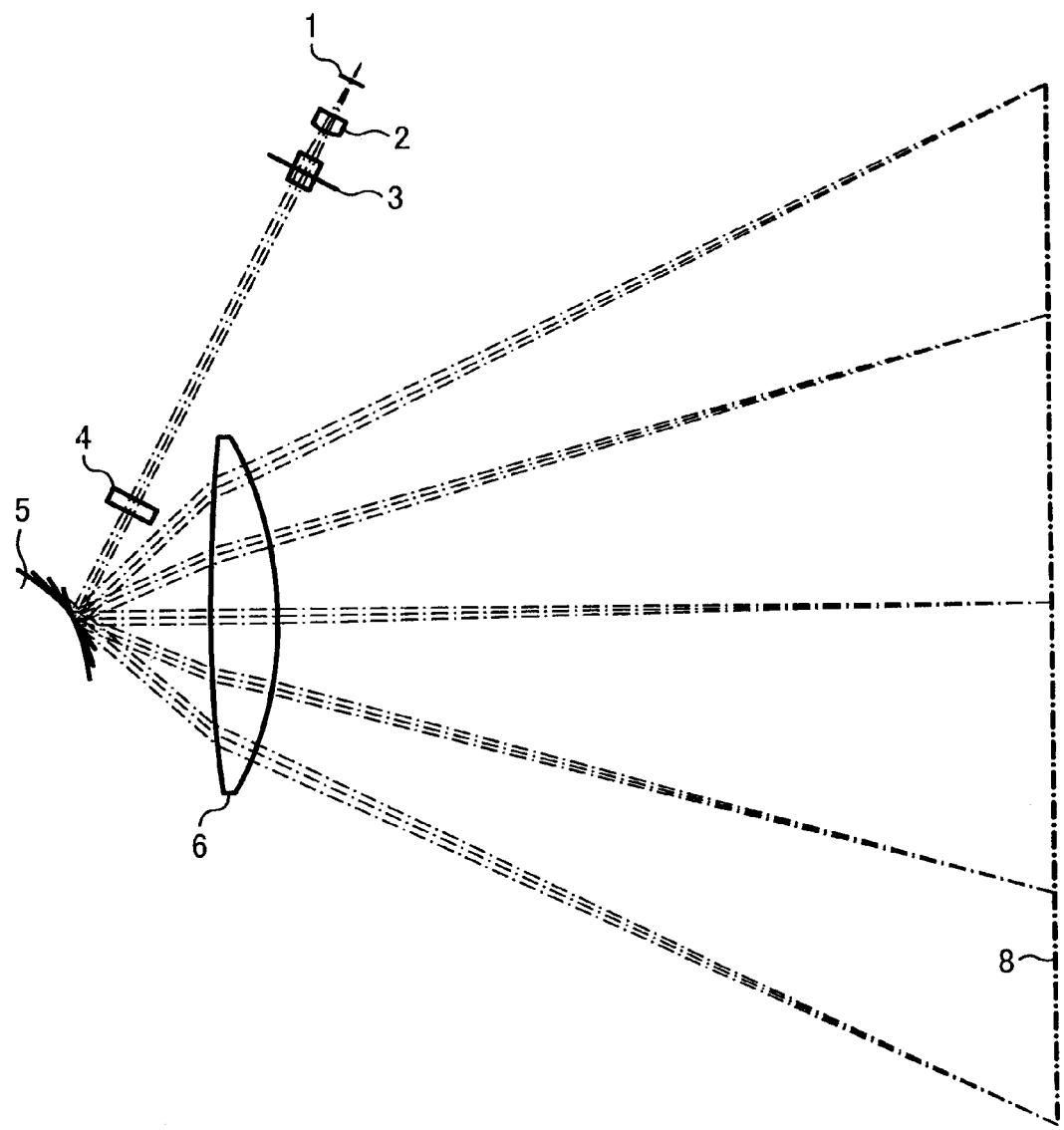
FIG. 3 is a schematic of an optical arrangement of the optical scanner according to a first embodiment of the present invention.
Figure 8:
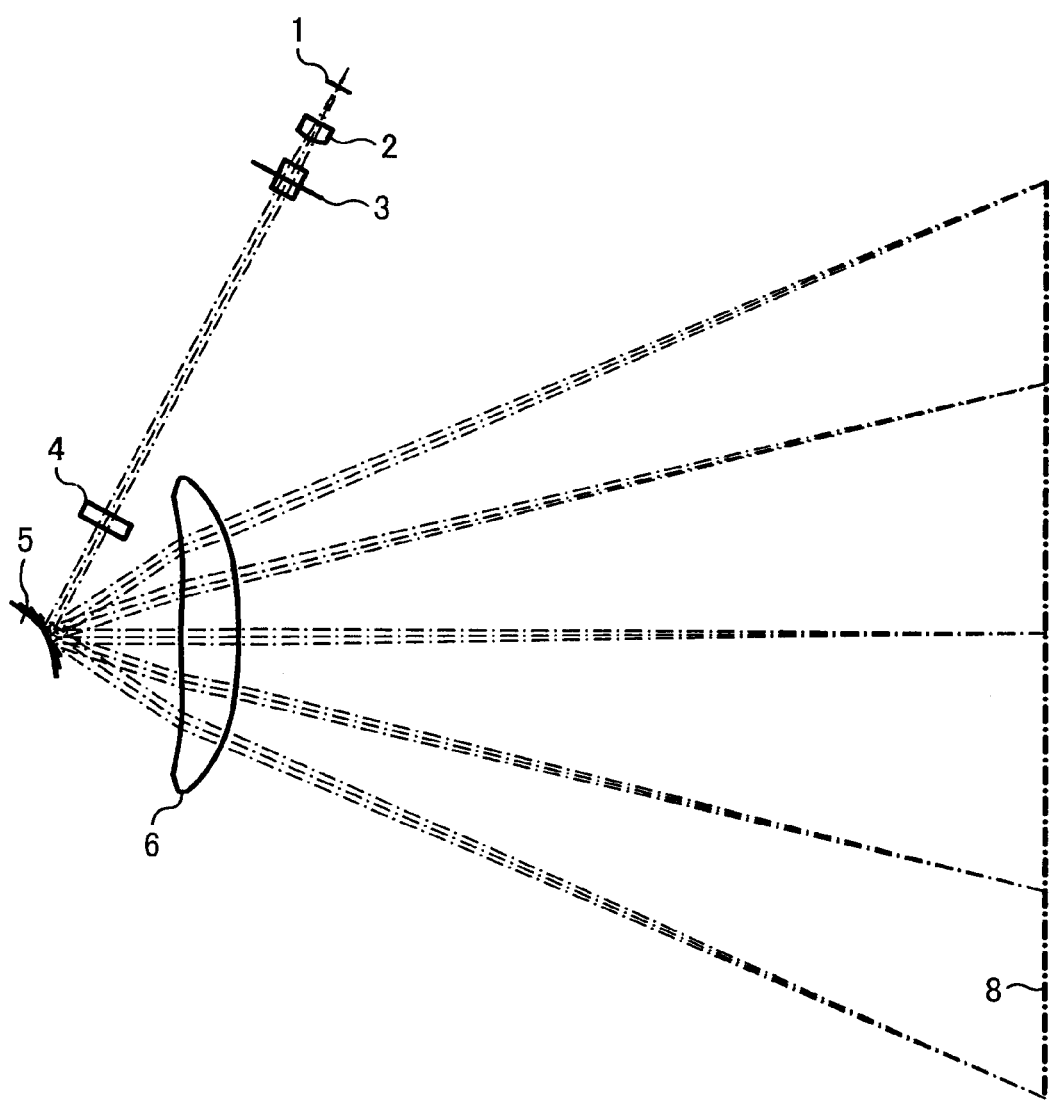
FIG. 8 is a schematic of an optical arrangement of the optical scanner according to a second embodiment of the present invention.
Figure 13:
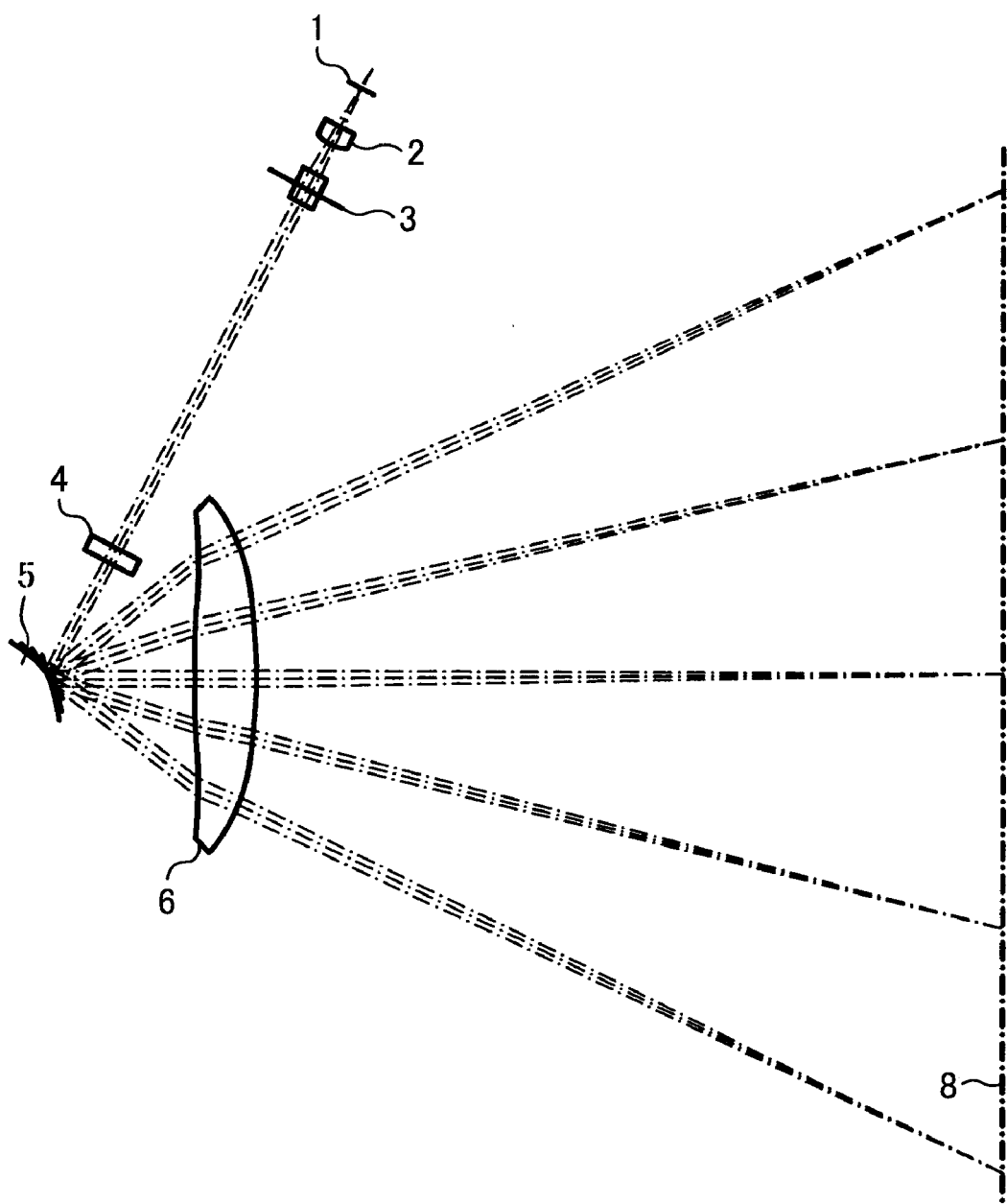
FIG. 13 is a schematic of an optical arrangement of the optical scanner according to a third embodiment of the present invention.

Three specific examples are explained below. In first, second, and third embodiments, optical arrangements of optical scanners are shown in FIGS. 3, 8, and 13, respectively.

A shape and the like of a lens surface shown in each example are defined as expressed by the following equations.

"Non-Circular Arc Shape in a Main Scanning Cross Section"

The shape of the lens surface is expressed by the following well-known polynomial (5). In the Equation (5), R denotes a paraxial radius of curvature in the main scanning cross section, Y denotes a distance in the main scanning direction from the optical axis, and K denotes a conical constant. In addition, $A_1, A_2, A_3, A_4, A_5, A_6, \ldots$, denotes high-order coefficients, and X denotes a depth in an optical axis direction.

$$X=(Y^2/R)/[1+\sqrt{1-(1+k)(Y/R)^2}]+A_1Y+A_2Y_2+A_3Y_3+ \\ A_4Y_4+A_5Y_5+A_6Y_6+\ldots \tag{5}$$

In the Equation (5), if one or more of the odd-number-order coefficients $A_1, A_3, A_5, \ldots$ are not 0, the shape of the lens surface is asymmetric in the main scanning direction.

"Curvature in Sub-Scanning Cross Section"

When a curvature (a reciprocal of the radius of curvature) in the sub-scanning cross section is changed in the main scanning direction (as expressed by a coordinate Y with an optical axis position set as an origin), the curvature C(Y) in the sub-scanning cross section is expressed by the following Equation (6). In the Equation (6), r(0) denotes a radius of curvature on the optical axis in the sub-scanning cross section, and $B_1, B_2, \ldots$ denote high-order coefficients.

$$C(Y)=\{1/r(0)\}+B_1Y+B_2Y_2+B_3Y_3+B_4Y_4+B_5Y_5+ \\ B_6Y_6+\ldots \tag{6}$$

In the Equation (6), if one or more of the odd-number order coefficients $B_1, B_3, B_5, \ldots$ of Y are not 0, the change of the radius of curvature in the sub-scanning cross section is asymmetric in the main scanning direction. If all the coefficients $B_1, B_2, B_3, \ldots$ of Y are 0, the lens surface is a constant curvature surface.

Analytical expressions of the special toric lens surface are not limited to those explained above but various expressions can be applied. The expression of the shape of the lens surface according to the present invention is not limited to those explained above.

Examples of the scanning optical system according to the present invention are explained below, with reference to specific numeric values.

"Light Source"

Wavelength: 780 nanometers

"Coupling Lens"

Focal length: 15 millimeters

Coupling action: divergent action

Natural convergence point, i.e., convergence position if the divergent luminous flux emitted from the coupling lens is inversely tracked: −259.76 millimeters from light source position toward scan target surface.

"Cylindrical Lens"

Focal length in sub-scanning direction: 26.49 millimeters

"Polygon Mirror"

The number of deflecting and reflecting surfaces: 6

Radius of inscribed circle: 16 millimeters

Angle between an incident angle of the luminous flux from the light source and the optical axis of the scanning optical system: 64 degrees "Data on the Optical System Arranged Between the Polygon Mirror and the Scan Target Surface"

The radius of curvature of the optical system in the main scanning direction is denoted by "R" and that in the sub-scanning direction is denoted by "r", and a refractive index of the optical system is denoted by "n". In the data shown in the following Table 1, "R, r" denotes a paraxial radius of curvature.

TABLE 1

| | Surface number: i | R | r | X | Y | n |
|---|---|---|---|---|---|---|
| Reflecting surface of optical deflector | 0 | 8 | | 28 | 0.38 | |
| Incident surface of lens | 1 | 177.446 | 101.000 | 13.5 | 0 | 1.523961 |
| Emission surface of lens | 2 | −90.211 | −17.636 | 158.5 | 0 | |

In the Table 1 above, symbols X and Y denote distances between vertexes for each of surface numbers i to i+1 in the optical axis direction and the main scanning direction, respectively. For example, X=28 and Y=0.38 for the surface number 0 (deflecting and reflecting surface) mean as follows. The vertex of the incident surface (surface number 1) of the lens 6 is distant from the position of the deflection and reflection point (reflection position at which an image height is 0) by 28 millimeters in the optical axis direction (X direction) and 0.38 millimeter in the main scanning direction (Y direction). X=13.5 for the surface number 1 means the thickness of the lens 6 on the optical axis. X=28 for the surface number 0 (deflecting and reflecting surface) corresponds to d0 according to claims 4, 10, 16, 27, and 33. X=158.5 for the surface number 2 (emission surface of the lens 6) corresponds to L according to claims 4, 10, 16, 27, and 33. Therefore, the scanning optical system satisfies the condition (1).

$$4.5 < L/d0 = 5.66 < 7.5$$

The incident surface (surface number: i=1) is the constant curvature surface and the shape in the main scanning cross section is the non-circular arc shape expressed by the Equation (6). Table 2 shows main scanning direction and sub-scanning direction coefficients of this incident surface.

TABLE 2

| Incident surface (surface number 1) of lens | |
|---|---|
| Main scanning direction coefficients | Sub-scanning direction coefficients |
| K     −8.031 × 10 | |
| $A_1$     0 | $B_1$ |
| $A_2$     0 | $B_2$ |
| $A_3$     0 | $B_3$ |
| $A_4$     −1.478 × 10$^{-06}$ | $B_4$ |
| $A_5$     0 | $B_5$ |
| $A_6$     2.229 × 10$^{-10}$ | $B_6$ |

TABLE 2-continued

| Incident surface (surface number 1) of lens | |
|---|---|
| Main scanning direction coefficients | Sub-scanning direction coefficients |
| $A_7$     0 | $B_7$ |
| $A_8$     5.515 × 10$^{-13}$ | $B_8$ |
| $A_9$     0 | $B_9$ |
| $A_{10}$     −7.251 × 10$^{-17}$ | $B_{10}$ |
| $A_{11}$     0 | $B_{11}$ |
| $A_{12}$     −1.087 × 10$^{-19}$ | $B_{12}$ |
| $A_{13}$     0 | $B_{13}$ |
| $A_{14}$     6.166 × 10$^{-23}$ | $B_{14}$ |

The emission surface (surface number: i=2) is the special lens surface and the shape thereof in the main scanning cross section is non-circular arc symmetric about the optical axis. Table 3 shows main scanning direction and sub-scanning direction coefficients of this emission surface.

TABLE 3

| Emission surface (surface number 2) of lens | |
|---|---|
| Main scanning direction coefficients | Sub-scanning direction coefficients |
| K     1.22 | |
| $A_1$     0 | $B_1$     −3.903 × 10$^{-05}$ |
| $A_2$     0 | $B_2$     1.347 × 10$^{-05}$ |
| $A_3$     0 | $B_3$     −1.570 × 10$^{-08}$ |
| $A_4$     −8.971 ×× 10$^{-07}$ | $B_4$     −1.182 × 10$^{-08}$ |
| $A_5$     0 | $B_5$     9.552 × 10$^{-12}$ |
| $A_6$     −2.513 × 10$^{-10}$ | $B_6$     6.557 × 10$^{-12}$ |
| $A_7$     0 | $B_7$ |
| $A_8$     1.706 × 10$^{-13}$ | $B_8$ |
| $A_9$     0 | $B_9$ |
| $A_{10}$     −3.419 × 10$^{-17}$ | $B_{10}$ |
| $A_{11}$     0 | $B_{11}$ |
| $A_{12}$     8.062 × 10$^{-20}$ | $B_{12}$ |
| $A_{13}$     0 | $B_{13}$ |
| $A_{14}$     4.869 × 10$^{-23}$ | $B_{14}$ |

Figure 4:
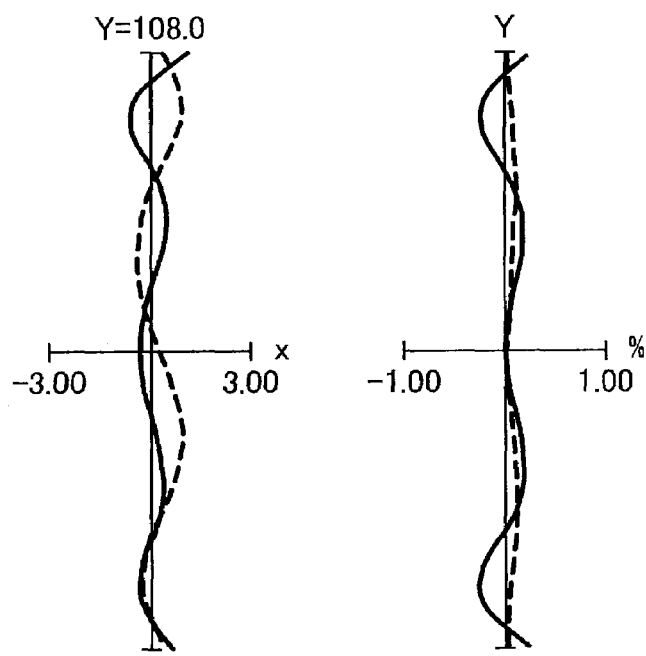
FIG. 4 is an aberration chart (of field curvatures and uniform velocity characteristics) in the optical scanner according to the first embodiment.

In the first embodiment, a lateral magnification $\beta_2$ of a central image height of the scanning optical system in the sub-scanning direction is 4.79. FIG. 4 depicts field curvatures (left chart: a solid line indicates a sub-scanning field curvature and a broken line indicates a main scanning field curvature) and constant velocity characteristics (right chart: a solid line indicates linearity and a broken line indicates an fθ characteristic)

Main scanning direction: 1.327 mm/216 mm

Sub-scanning direction: 1.676 mm/216 mm

Linearity: 0.493%/216 mm

As evident from FIG. 4, both the field curvatures and the constant velocity characteristics are corrected considerably satisfactorily.

Figure 5:
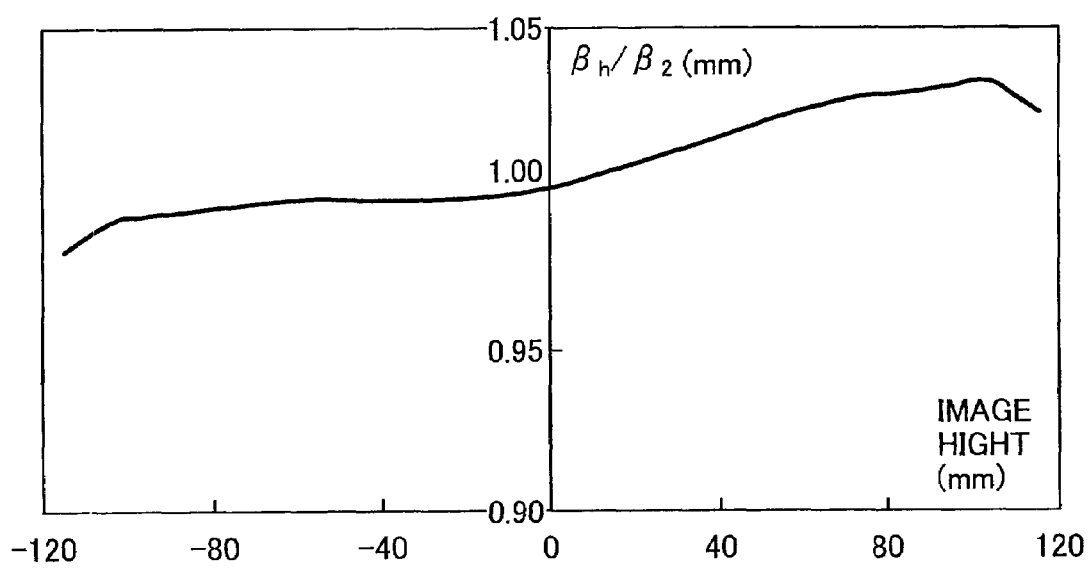
FIG. 5 is a line plot of magnification change $|\beta_h/\beta_2|$ in the optical scanner according to the first embodiment.

FIG. 5 depicts a change of the sub-scanning direction lateral magnification $\beta_h$ of an arbitrary image height relative to the sub-scanning direction lateral magnification $\beta_2$ of the central image height. The magnification change $|\beta_h/\beta_2|$ is corrected considerably satisfactorily.

Figure 6A:
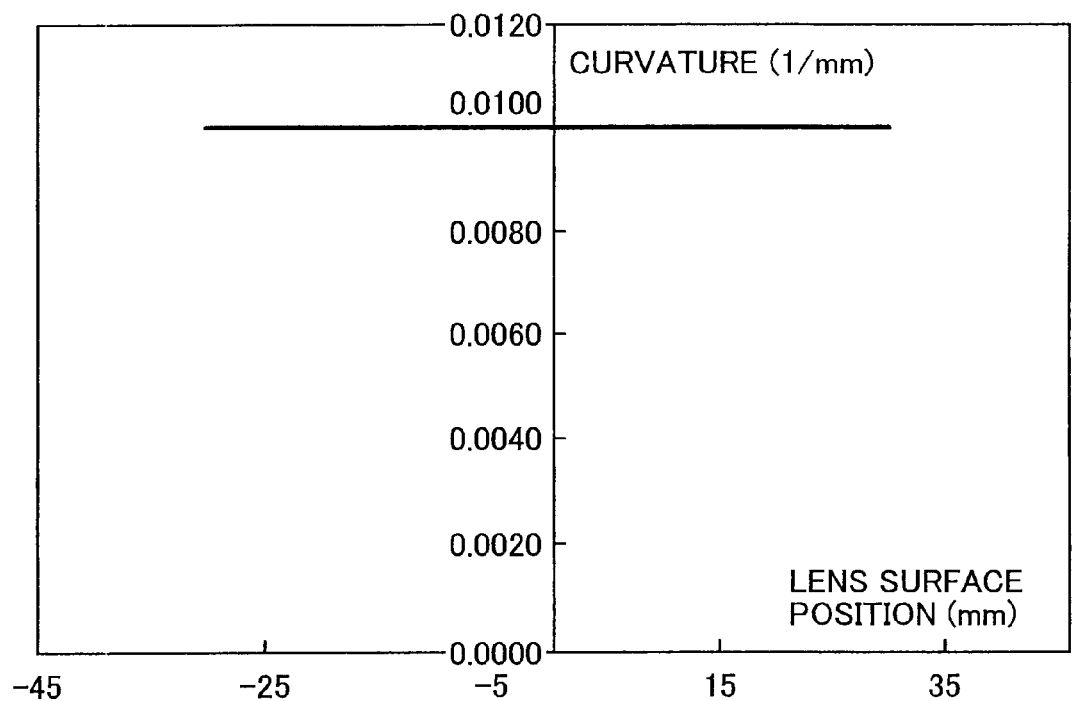
FIGS. 6A and 6B are line plots for illustrating a curvature on a sub-scanning cross section of a lens in a scanning optical system according to the first embodiment.
Figure 6B:
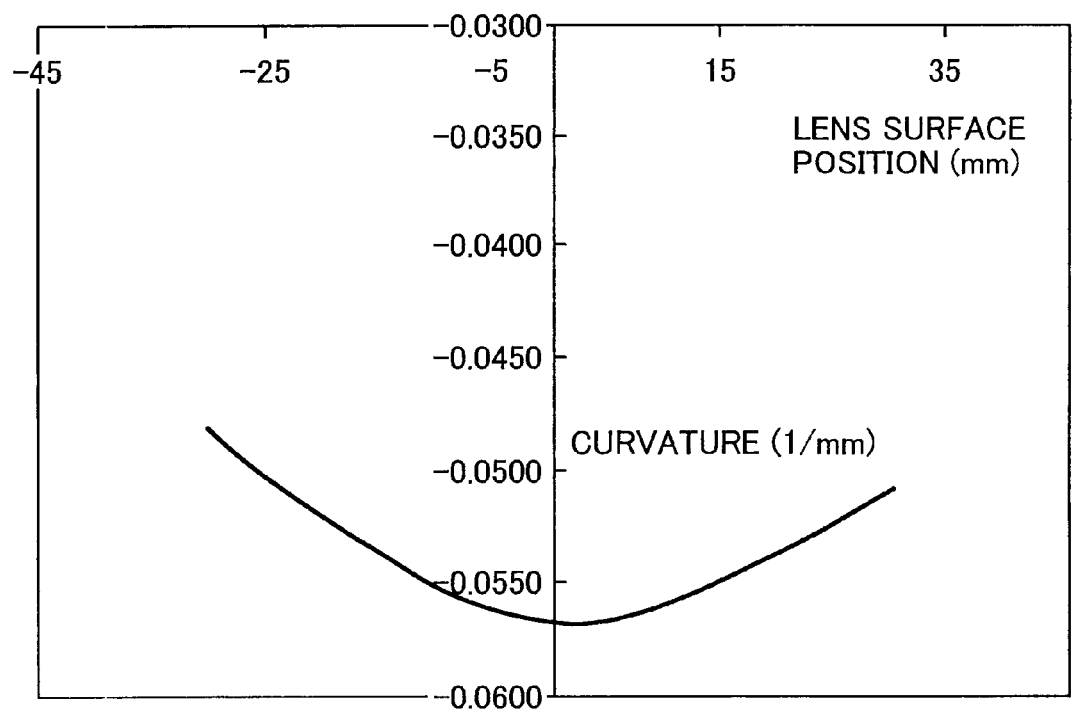

FIGS. 6A and 6B depict curvature changes of the incident surface and the emission surface of the lens 6, respectively. In this example, the incident surface is the "constant curvature surface".

Figure 7A:
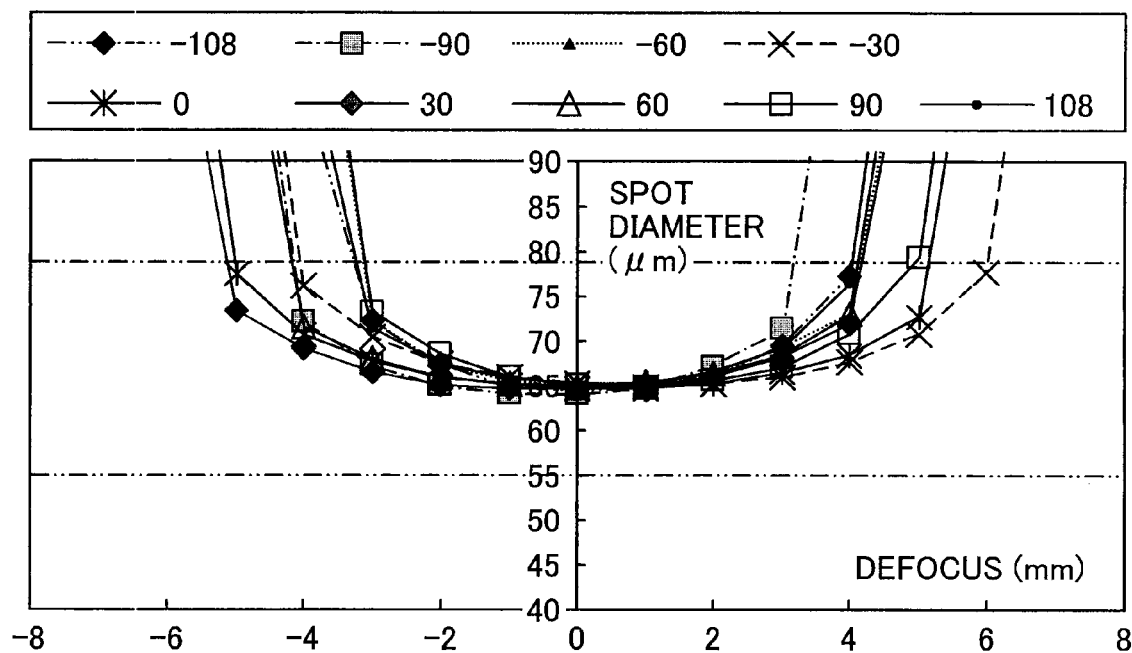
FIGS. 7A and 7B are depth curves of a diameter of a light spot for every image height in the optical scanner according to the first embodiment.
Figure 7B:
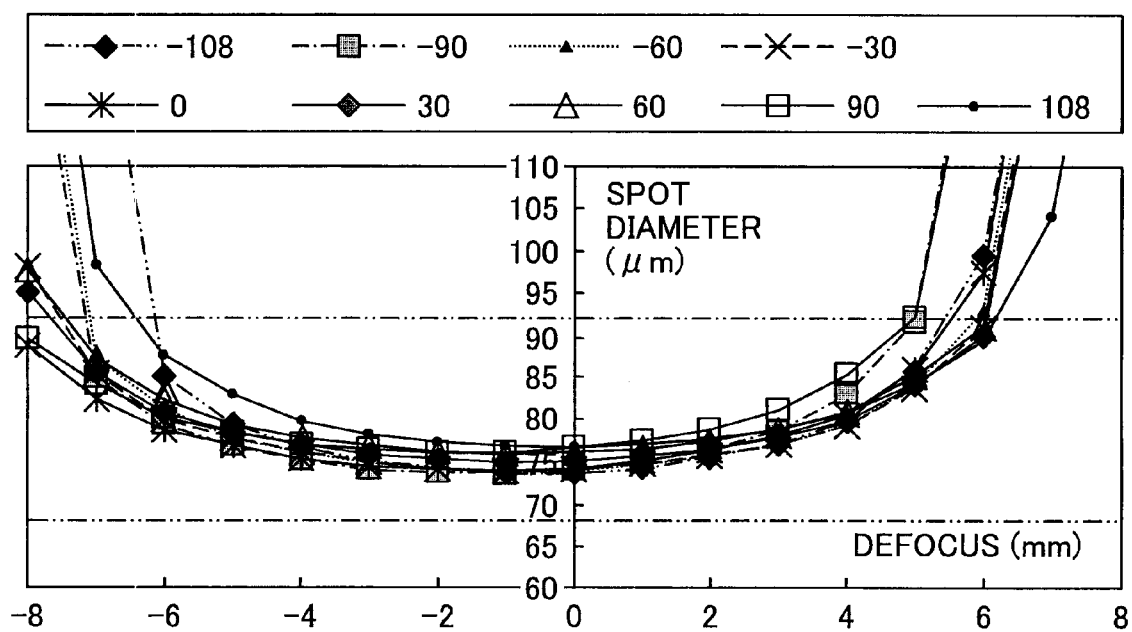

FIGS. 7A and 7B depict spot diameter depth curves (spot diameter changes relative to defocus of the light spot) for each image height of the light spot in the first embodiment. FIG. 7A relates to the main scanning direction and FIG. 7B relates to the sub-scanning direction. In the first embodiment, the spot diameter defined by the intensity $1/e^2$ of the line spread function is intended at about 50 micrometers. As shown in FIGS. 7A and 7B, the spot diameter has sufficient depths in both the main scanning direction and the sub-scanning direction, so that a high tolerance is ensured for positional accuracy for the scan target surface.

In the first embodiment, the lens 6 that constitutes the scanning optical system consists of a plastic material. Alternatively, a glass material can be used as a material for the lens 6. In addition, to further reduce the beam spot diameter, the shape of the surface of the lens 6 can be non-circular arc in the sub-scanning direction.

Furthermore, by decentering the scanning optical system, the aberration corrections can be made more satisfactorily. In the first embodiment, the good performances are realized by tilting the lens 6 by 0.33 degree with respect to a normal of the scan target surface.

FIG. 8 depicts an optical scanner according to a second embodiment that includes the scanning optical system of the present invention. In FIG. 8, optical components are designated by like reference numerals as those in the first embodiment.

"Light Source"
Wavelength: 780 nanometers

"Coupling Lens"
Focal length: 15 millimeters
Coupling action: divergent action
Natural convergence point: −1256.179 millimeters from light source position toward scan target surface.

"Cylindrical Lens"
Focal length in sub-scanning direction: 26.49 millimeters.

"Polygon Mirror"
The number of deflecting and reflecting surfaces: 6
Radius of inscribed circle: 13 millimeters
Angle between an incident angle of the luminous flux from the light source and the optical axis of the scanning optical system: 64 degrees "Data on the Optical System Arranged Between the Polygon Mirror and the Scan Target Surface": See Table 4.

TABLE 4

| | Surface number: i | R | r | X | Y | n |
|---|---|---|---|---|---|---|
| Reflecting surface of optical deflector | 0 | 8 | 8 | 31.5 | 0.24 | |
| Incident surface of lens | 1 | 313.457 | 81.026 | 13.5 | 0 | 1.523961 |
| Emission surface of lens | 2 | −121.007 | −20.491 | 189 | 0 | |

X=189 for the surface number 2 (emission surface of the lens 6) corresponds to L according to claims 4, 10, 16, 27, and 33. Therefore, the scanning optical system satisfies the condition (1).

$$4.5 < L/d0 = 5.66 < 7.5$$

The incident surface (surface number: i=1) is the constant curvature surface and the shape in the main scanning cross section is the non-circular arc shape expressed by the Equation (6). Table 5 shows main scanning direction and sub-scanning direction coefficients of this incident surface.

TABLE 5

| Incident surface of lens | | |
|---|---|---|
| Main scanning direction coefficients | | Sub-scanning direction coefficients |
| K | $-2.561 \times 10^2$ | |
| $A_1$ | 0 | $B_1$ |
| $A_2$ | 0 | $B_2$ |
| $A_3$ | 0 | $B_3$ |
| $A_4$ | $-3.102 \times 10^{-6}$ | $B_4$ |
| $A_5$ | 0 | $B_5$ |
| $A_6$ | $-9.584 \times 10^{-10}$ | $B_6$ |
| $A_7$ | 0 | $B_7$ |
| $A_8$ | $1.050 \times 10^{-12}$ | $B_8$ |
| $A_9$ | 0 | $B_9$ |
| $A_{10}$ | $-5.491 \times 10^{-16}$ | $B_{10}$ |
| $A_{11}$ | 0 | $B_{11}$ |
| $A_{12}$ | $-2.566 \times 10^{-19}$ | $B_{12}$ |
| $A_{13}$ | 0 | $B_{13}$ |
| $A_{14}$ | $7.360 \times 10^{-22}$ | $B_{14}$ |

The emission surface (surface number: i=2) is the special lens surface and the shape thereof in the main scanning cross section is non-circular arc symmetric about the optical axis.

Table 6 shows main scanning direction and sub-scanning direction coefficients of this emission surface.

TABLE 6

| Emission surface of lens | | | |
|---|---|---|---|
| Main scanning direction coefficients | | Sub-scanning direction coefficients | |
| K | −5.064 | | |
| $A_1$ | 0 | $B_1$ | $-2.233 \times 10^{-5}$ |
| $A_2$ | 0 | $B_2$ | $1.361 \times 10^{-5}$ |
| $A_3$ | 0 | $B_3$ | $-5.889 \times 10^{-9}$ |
| $A_4$ | $-2.486 \times 10^{-06}$ | $B_4$ | $-1.225 \times 10^{-8}$ |
| $A_5$ | 0 | $B_5$ | $-2.491 \times 10^{-12}$ |
| $A_6$ | $-8.750 \times 10^{-10}$ | $B_6$ | $-1.650 \times 10^{-12}$ |
| $A_7$ | 0 | $B_7$ | |
| $A_8$ | $2.321 \times 10^{-13}$ | $B_8$ | |
| $A_9$ | 0 | $B_9$ | |
| $A_{10}$ | $-3.810 \times 10^{-16}$ | $B_{10}$ | |
| $A_{11}$ | 0 | $B_{11}$ | |
| $A_{12}$ | $-2.591 \times 10^{-21}$ | $B_{12}$ | |
| $A_{13}$ | 0 | $B_{13}$ | |
| $A_{14}$ | $1.155 \times 10^{-22}$ | $B_{14}$ | |

In the second embodiment, a lateral magnification $\beta_2$ of a central image height of the scanning optical system in the sub-scanning direction is 4.8.

Figure 9:
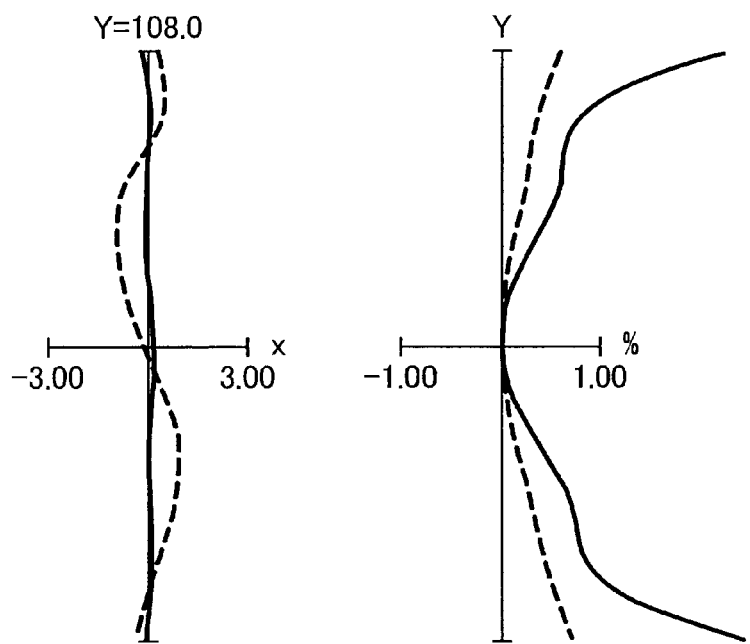
FIG. 9 is an aberration chart (of field curvatures and uniform velocity characteristics) in the optical scanner according to the second embodiment.

FIG. 9 depicts field curvatures (left chart: a solid line indicates a sub-scanning field curvature and a broken line indicates a main scanning field curvature) and constant velocity characteristics (right chart: a solid line indicates linearity and a broken line indicates an fθ characteristic).

Main scanning direction: 1.634 mm/216 mm
Sub-scanning direction: 0.306 mm/216 mm
Linearity: 2.506%/216 mm As evident from FIG. 9, both the field curvatures and the constant velocity characteristics are corrected considerably satisfactorily.

In addition, for the effective write width W=216 millimeters, the sub-scanning field curvature Fs is 0.305 millimeters. The scanning optical system satisfies the condition (4):

$$Fs/W = 0.0014 < 0.005.$$

Figure 10:
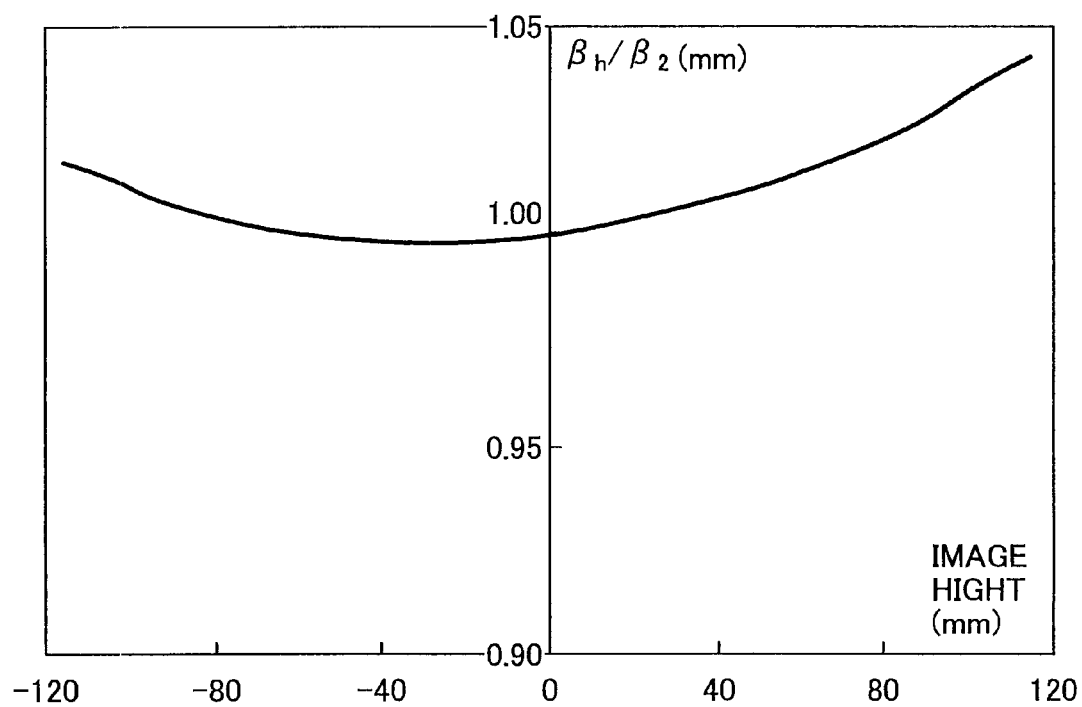
FIG. 10 is a line plot of magnification change $|\beta_h/\beta_2|$ in the optical scanner according to the second embodiment.

FIG. 10 depicts a change of the sub-scanning direction lateral magnification $\beta_h$ of an arbitrary image height relative to the sub-scanning direction lateral magnification $\beta_2$ of the central image height. The magnification change $|\beta_h/\beta_2|$ is corrected considerably satisfactorily.

Figure 11A:
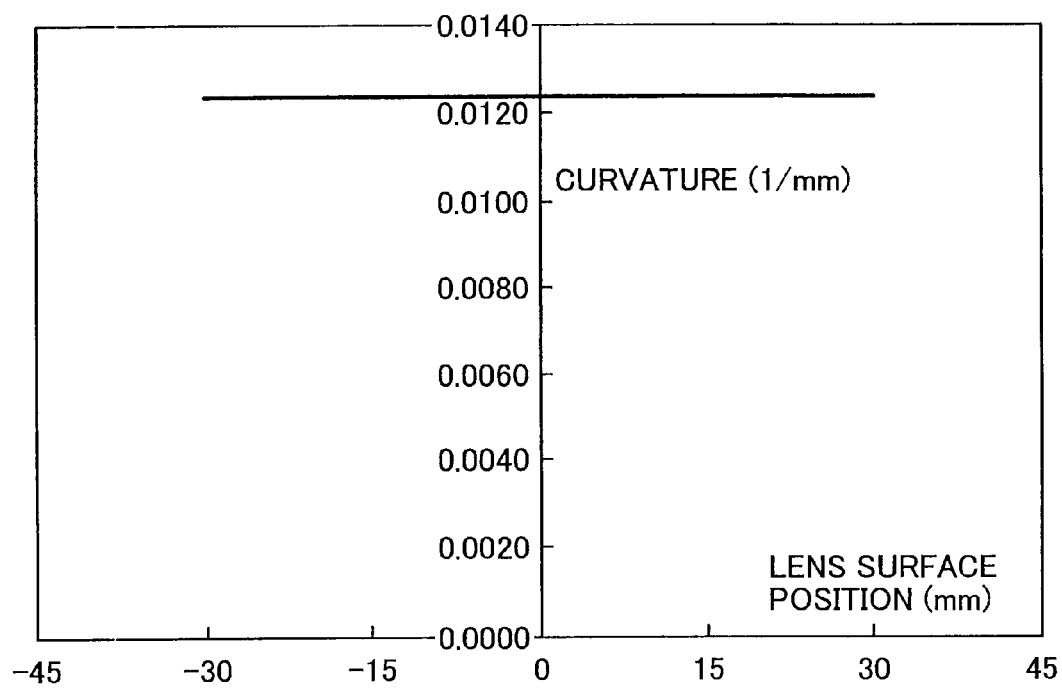
FIGS. 11A and 11B are line plots for illustrating a curvature on a sub-scanning cross section of a lens in a scanning optical system according to the second embodiment.
Figure 11B:
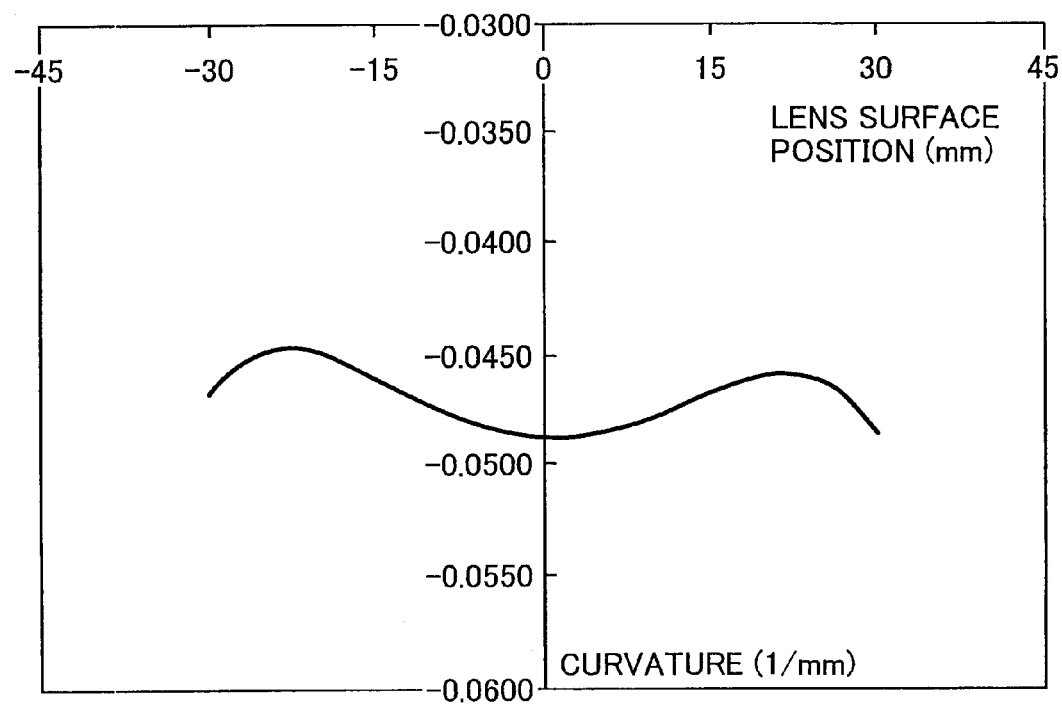

FIGS. 11A and 11B depict curvature changes of the incident surface and the emission surface of the lens 6, respectively. In this example, the incident surface is the "constant curvature surface".

Figure 12A:
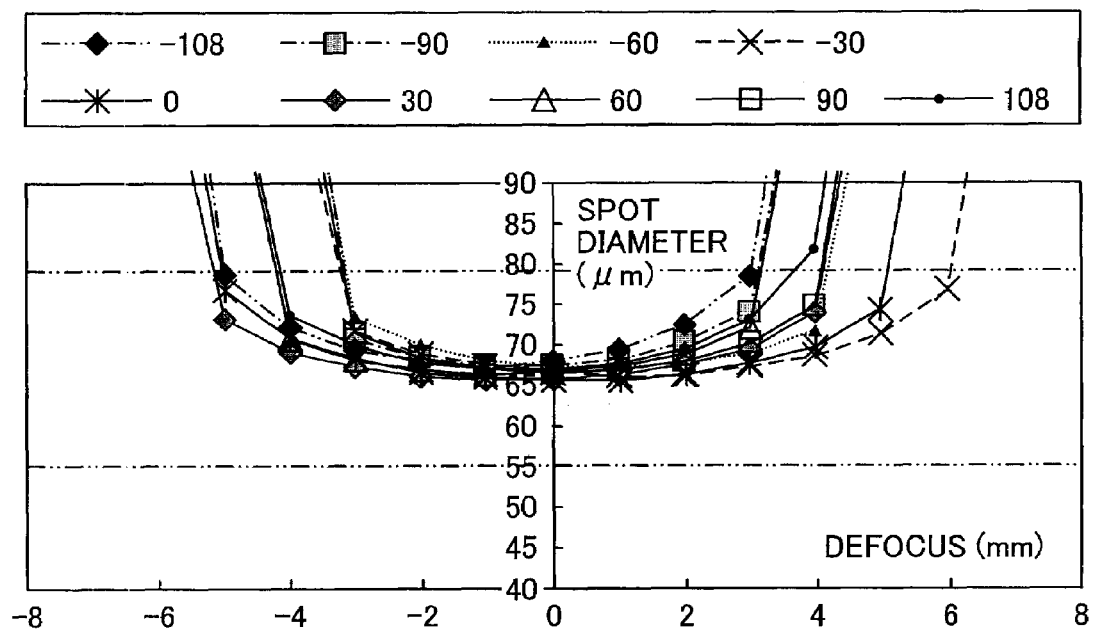
FIGS. 12A and 12B are depth curves of a diameter of a light spot for every image height in the optical scanner according to the second embodiment.
Figure 12B:
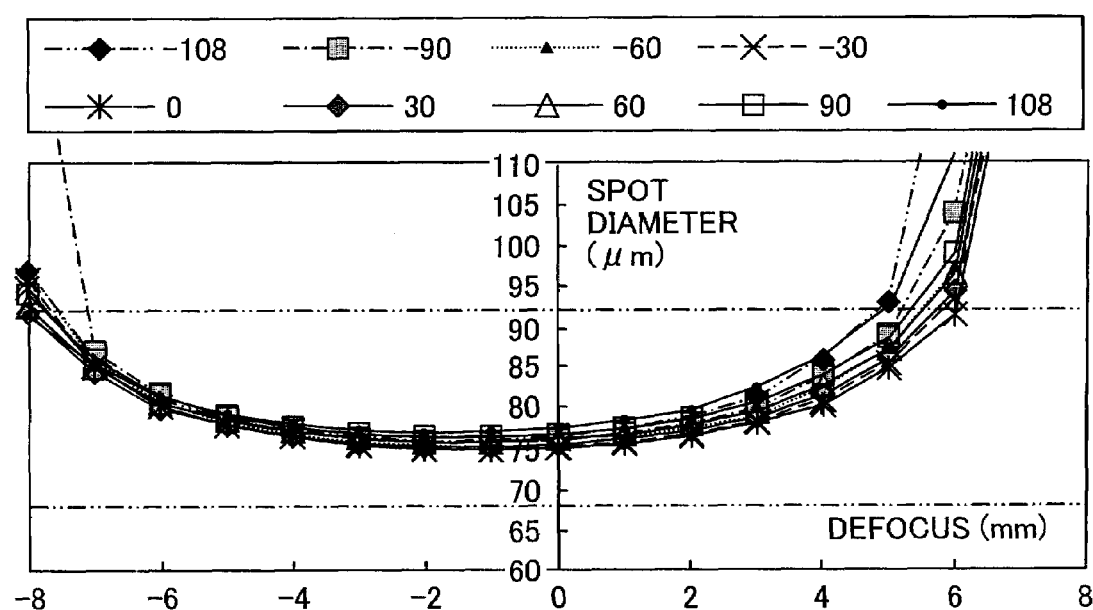

FIGS. 12A and 12B depict spot diameter depth curves (spot diameter changes relative to defocus of the light spot) for each image height of the light spot in the second embodiment. The spot diameter has sufficient depths in both the main scanning direction and the sub-scanning direction, so that a high tolerance is ensured for positional accuracy for the scan target surface.

In the second embodiment, the lens 6 that constitutes the scanning optical system consists of a plastic material. Alternatively, a glass material can be used as a material for the lens 6. In addition, to further reduce the beam spot diameter, the shape of the surface of the lens 6 can be non-circular arc in the sub-scanning direction. Furthermore, by decentering the scanning optical system, the aberration corrections can be made more satisfactorily.

FIG. 13 depicts an optical scanner according to a third embodiment that includes the scanning optical system of the present invention. In FIG. 13, optical components are designated by like reference numerals as those in the first and the second embodiments.

"Light Source"

Wavelength: 780 nanometers

"Coupling Lens"

Focal length: 15 millimeters

Coupling action: divergent action

Natural convergence point: −1256.179 millimeters from light source position toward scan target surface.

"Cylindrical Lens"

Focal length in sub-scanning direction: 26.49 millimeters

"Polygon Mirror"

The number of deflecting and reflecting surfaces: 6

Radius of inscribed circle: 13 millimeters

Angle between an incident angle of the luminous flux from the light source and the optical axis of the scanning optical system: 64 degrees "Data on the Optical System Arranged Between the Polygon Mirror and the Scan Target Surface": See Table 7.

TABLE 7

| | Surface number: i | R | r | X | n |
|---|---|---|---|---|---|
| Reflecting surface of optical deflector | 0 | 8 | 8 | 31.5 | |
| Incident surface of lens | 1 | 185.818 | 104.037 | 13.5 | 1.523961 |
| Emission surface of lens | 2 | −127.160 | −18.791 | 160 | |

X=160 for the surface number 2 (emission surface of the lens 6) corresponds to L according to claims 4, 10, 16, 27, and 33. Therefore, the scanning optical system satisfies the condition (1).

$$4.5 < L/d0 = 5.66 < 7.5$$

The incident surface (surface number: i=1) is the constant curvature surface and the shape in the main scanning cross section is the non-circular arc shape expressed by the Equation (6). Table 8 shows main scanning direction and sub-scanning direction coefficients of this incident surface.

TABLE 8

| Incident surface of lens | | |
|---|---|---|
| Main scanning direction coefficients | | Sub-scanning direction coefficients |
| K | −5.753 × 10 | |
| $A_1$ | 0 | $B_1$ |
| $A_2$ | 0 | $B_2$ |
| $A_3$ | 0 | $B_3$ |
| $A_4$ | −1.143 × 10$^{-6}$ | $B_4$ |
| $A_5$ | 0 | $B_5$ |
| $A_6$ | −2.816 × 10$^{-10}$ | $B_6$ |
| $A_7$ | 0 | $B_7$ |
| $A_8$ | 2.058 × 10$^{-13}$ | $B_8$ |
| $A_9$ | 0 | $B_9$ |
| $A_{10}$ | −9.319 × 10$^{-17}$ | $B_{10}$ |
| $A_{11}$ | 0 | $B_{11}$ |
| $A_{12}$ | −2.947 × 10$^{-20}$ | $B_{12}$ |
| $A_{13}$ | 0 | $B_{13}$ |
| $A_{14}$ | 1.991 × 10$^{-23}$ | $B_{14}$ |

The emission surface (surface number: i=2) is the special lens surface and the shape thereof in the main scanning cross section is non-circular arc symmetric about the optical axis. Table 9 shows main scanning direction and sub-scanning direction coefficients of this emission surface.

TABLE 9

| Emission surface of lens | | | |
|---|---|---|---|
| Main scanning direction coefficients | | Sub-scanning direction coefficients | |
| K | −3.133 × 10$^{-1}$ | | |
| $A_1$ | 0 | $B_1$ | −1.481 × 10$^{-5}$ |
| $A_2$ | 0 | $B_2$ | 1.431 × 10$^{-5}$ |
| $A_3$ | 0 | $B_3$ | −1.323 × 10$^{-8}$ |
| $A_4$ | −8.235 × 10$^{-7}$ | $B_4$ | −6.382 × 10$^{-9}$ |
| $A_5$ | 0 | $B_5$ | 3.373 × 10$^{-12}$ |
| $A_6$ | −4.142 × 10$^{-10}$ | $B_6$ | −9.084 × 10$^{-13}$ |
| $A_7$ | 0 | $B_7$ | |
| $A_8$ | −3.725 × 10$^{-14}$ | $B_8$ | |
| $A_9$ | 0 | $B_9$ | |
| $A_{10}$ | −9.118 × 10$^{-18}$ | $B_{10}$ | |
| $A_{11}$ | 0 | $B_{11}$ | |
| $A_{12}$ | 3.553 × 10$^{-21}$ | $B_{12}$ | |
| $A_{13}$ | 0 | $B_{13}$ | |
| $A_{14}$ | −2.331 × 10$^{-23}$ | $B_{14}$ | |

In the third embodiment, a lateral magnification $\beta_2$ of a central image height of the scanning optical system in the sub-scanning direction is 4.25.

Figure 14:
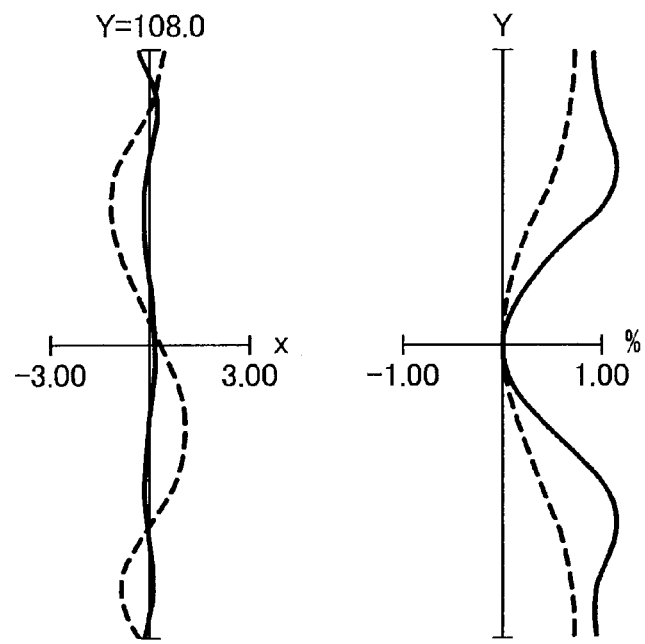
FIG. 14 is an aberration chart (of field curvatures and uniform velocity characteristics) in the optical scanner according to the third embodiment.

FIG. 14 depicts field curvatures (left chart: a solid line indicates a sub-scanning field curvature and a broken line indicates a main scanning field curvature) and constant velocity characteristics (right chart: a solid line indicates linearity and a broken line indicates an fθ characteristic).

Main scanning direction: 2.153 mm/216 mm
Sub-scanning direction: 0.505 mm/216 mm
Linearity: 1.144%/216 mm As evident from FIG. 14, both the field curvatures and the constant velocity characteristics are corrected considerably satisfactorily.

In addition, for the effective write width W=216 millimeters, the sub-scanning field curvature Fs is 0.505 millimeters. The scanning optical system satisfies the condition (4):

$$Fs/W=0.0014<0.005.$$

Figure 15:
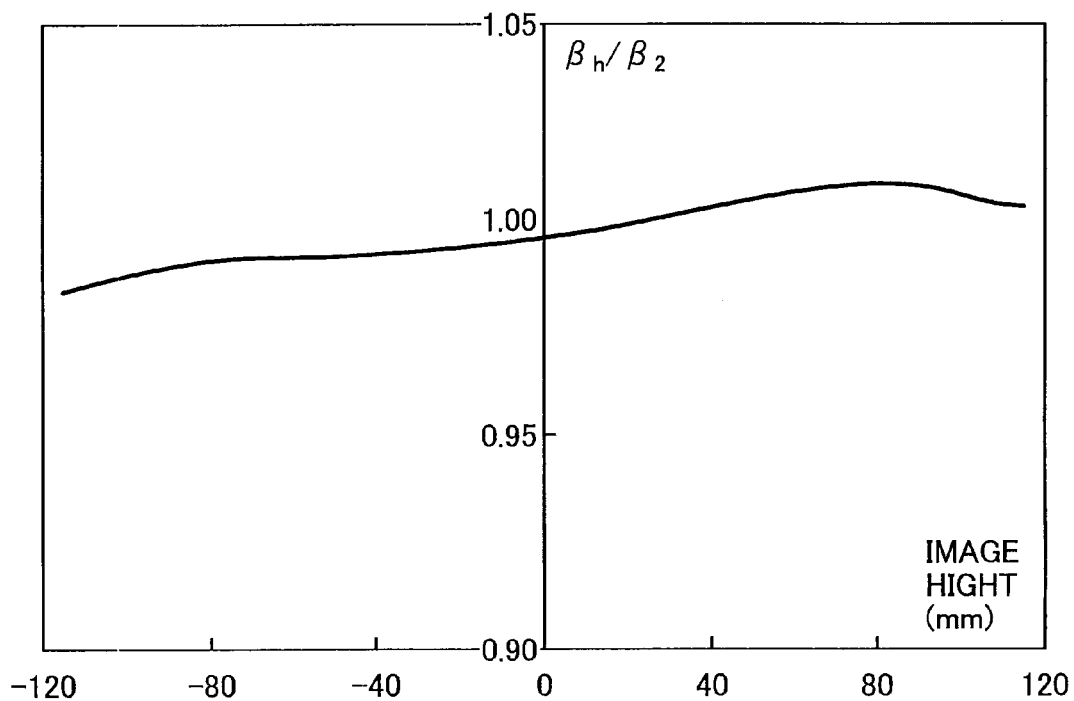
FIG. 15 is a line plot of magnification change $|\beta_h/\beta_2|$ in the optical scanner according to the third embodiment.

FIG. 15 depicts a change of the sub-scanning direction lateral magnification $\beta_h$ of an arbitrary image height relative to the sub-scanning direction lateral magnification $\beta_2$ of the central image height in the third embodiment. The magnification change $|\beta_h/\beta_2|$ is corrected considerably satisfactorily.

Figure 16A:
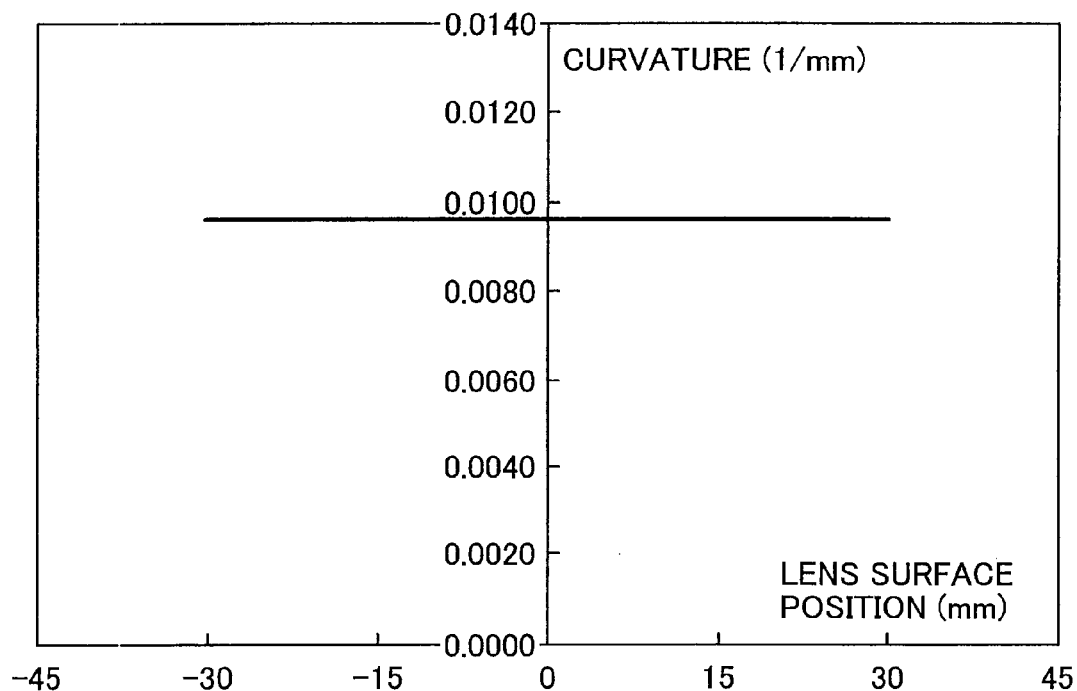
FIGS. 16A and 16B are line plots for illustrating a curvature on a sub-scanning cross section of a lens in a scanning optical system according to the third embodiment.
Figure 16B:
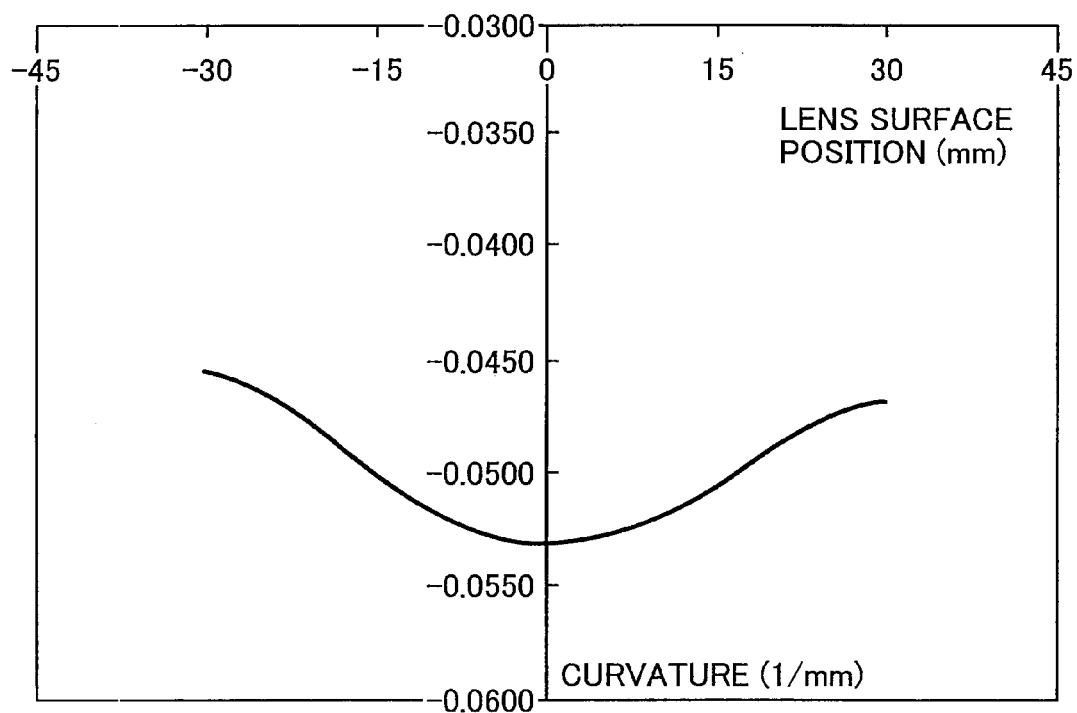

FIGS. 16A and 16B depict curvature changes of the incident surface and the emission surface of the lens 6, respectively. In this example, the incident surface is the "constant curvature surface".

Figure 17A:
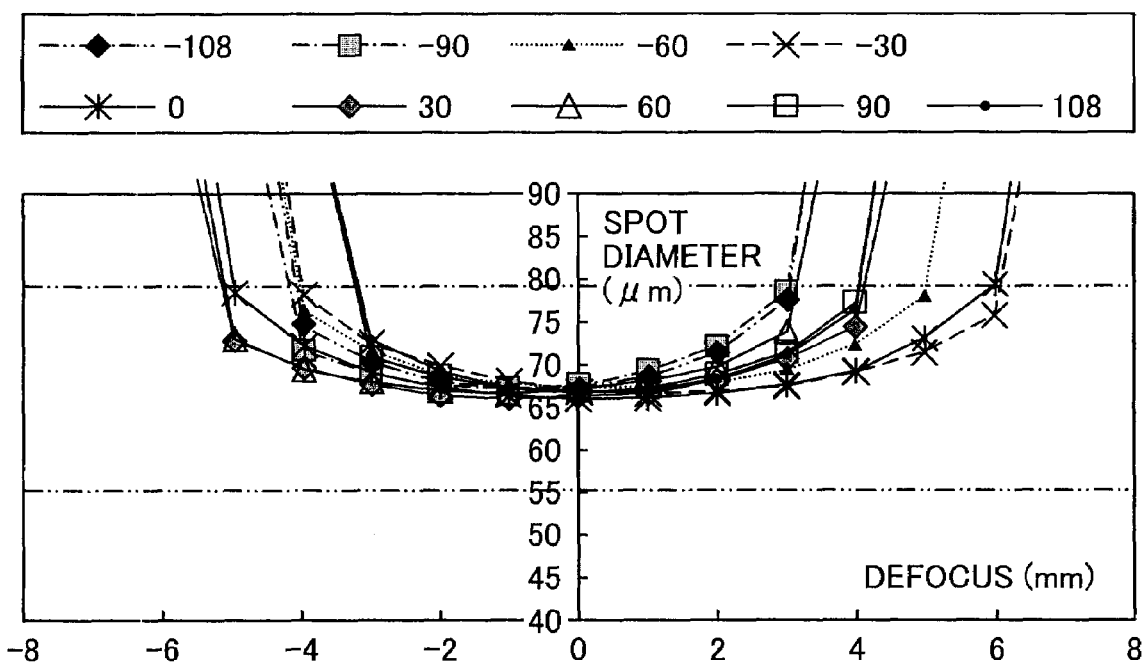
FIGS. 17A and 17B are depth curves of a diameter of a light spot for every image height in the optical scanner according to the third embodiment.
Figure 17B:
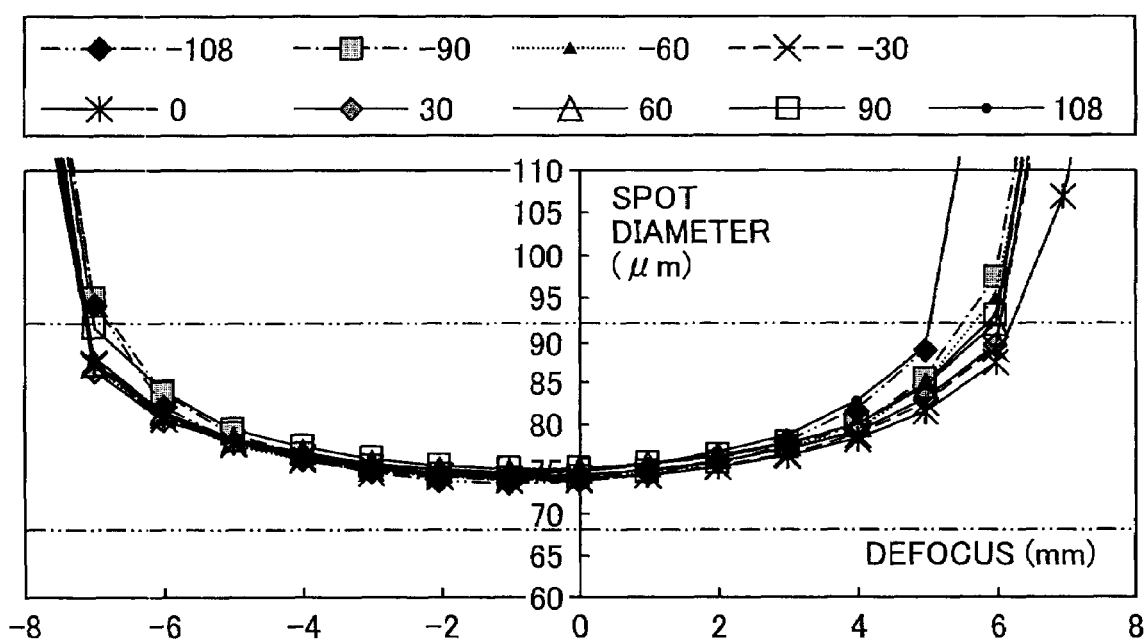

FIGS. 17A and 17B depict spot diameter depth curves (spot diameter changes relative to defocus of the light spot) for each image height of the light spot in the third embodiment. The spot diameter has sufficient depths in both the main scanning direction and the sub-scanning direction, so that a high tolerance is ensured for positional accuracy for the scan target surface.

In the third embodiment, the lens 6 that constitutes the scanning optical system consists of a plastic material. Alternatively, a glass material can be used as a material for the lens 6. In addition, to further reduce the beam spot diameter, the shape of the surface of the lens 6 can be non-circular arc in the sub-scanning direction.

Furthermore, by decentering the scanning optical system, the aberration corrections can be made more satisfactorily. In the third embodiment, the good performances are realized by tilting the lens 6 by 0.1 degree with respect to a normal of the scan target surface.

Figure 18:
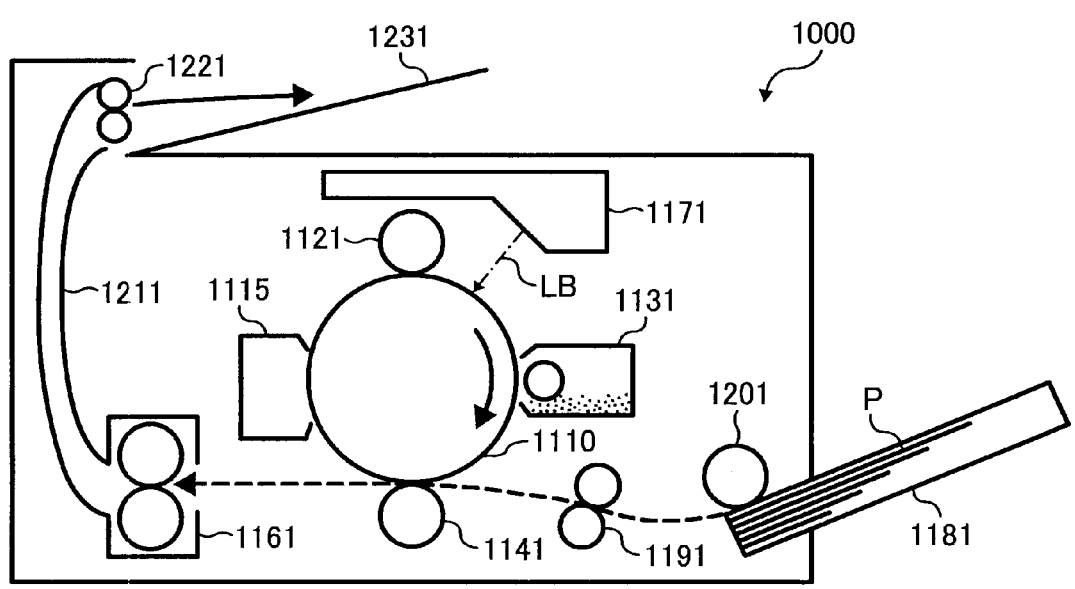
FIG. 18 is a front view of an image forming apparatus according to an embodiment of the present invention.

An image forming apparatus according to another embodiment of the present invention is explained next. FIG. 18 depicts the image forming apparatus according to the embodiment. In this embodiment, the image forming apparatus is a laser printer. In FIG. 18, a laser printer 1000 includes, as a photosensitive image carrier 1110, a photosensitive element formed into a cylindrical shape. A charging roller 1121 serving as charging means, a developing unit 1131, a transfer roller 1141, and a cleaner 1151 are arranged around the image carrier 1110. Alternatively, a corona charger can be used as the charging means. An optical scanner 1171 that performs an optical scan using a laser beam LB is provided above the image carrier 1110 and the charging roller 1121, and an exposure is performed between the charging roller 1121 and the developing unit 1131 by optical writing. As the optical scanner 1171, any one of the optical scanners according to the preceding examples explained so far is employed.

In FIG. 18, reference numeral 1161 denotes a fixing device, 1181 denotes a paper feed cassette, 1191 denotes a registration roller pair, 1201 denotes a paper feed roller, 1211 denotes a transfer sheet transport path, 1221 denotes a paper discharge roller pair, 1231 denotes a tray, and P denotes a transfer sheet serving as a sheet-like recording medium. During image formation, the image carrier 1110, which is the photosensitive element, is rotated clockwise at constant velocity. A surface of the image carrier 1110 is uniformly charged by the charging roller 1121. The optical scanner 1171 optically writes information on the surface of the image carrier 1110 by the laser beam LB, thereby performing exposure and forming an electrostatic latent image. The electrostatic latent image thus formed is a so-called negative latent image, an image part of which is exposed to the light.

The electrostatic latent image is inverted and developed by the developing unit 1131, thereby forming a toner image on the image carrier 1110. The cassette 1181 in which the transfer sheets P are stacked is detachably attached to a main unit of the image forming apparatus 1000. In a state, shown in FIG. 18, in which the cassette 1181 is attached to the main unit, an uppermost transfer sheet P is drawn out by the paper feed roller 1201. A tip end of the transfer sheet P thus drawn out is caught up by the registration roller pair 1191. The registration roller pair 1191 feed the transfer sheet P to the transfer roller 1141, which serves as a transfer unit, at a timing at which the toner image on the image carrier 1110 is moved to a transfer position.

The toner image is registered on the transfer sheet P fed to the transfer unit 1141, and is electrostatically transferred onto the transfer sheet P by an action of the transfer roller 1141. The transfer sheet P is fed to the fixing device 1161, which fixes the toner image onto the transfer sheet P. The transfer sheet P is passed through the transport path 1211 and discharged onto the tray 1231 by the paper discharge roller pair 1221. The surface of the image carrier 1110 after the toner image is transferred onto the transfer sheet P is cleaned by the cleaner 1151 to eliminate residual toners, paper dust, and the like.

By employing any one of the optical scanners shown in FIGS. 1, 8, and 13 as the optical scanner 1171, it is possible to form quite a satisfactory image.

Furthermore, a so-called tandem type color image forming apparatus can be configured as follows. A plurality of photoconductive image carriers are arranged, optical scanners corresponding to the respective image carriers perform optical scan thereon to form latent images corresponding to respective colors. These latent images are visualized by a developing unit, and registered and transferred onto transfer mediums such as transfer sheets, respectively, thereby obtaining a color image. By employing any one of the optical scanners according to the preceding examples as each optical scanner of this color image forming apparatus, it is possible to form quite a satisfactory color image.

As explained so far, the present invention can realize a novel scanning optical system, a novel optical scanner, a novel image forming apparatus, and a novel color image forming apparatus.

According to the embodiments described above, it is possible to reduce cost and size of an optical scanner while enabling correction of not only the geometric optical aberration but also the wave optical aberration. Moreover, it is possible to reduce a diameter of the light spot, thereby performing satisfactory optical scan. Furthermore, it is possible to form a fine image.

Moreover, according to the embodiments described above, it is possible to lessen the influence of optical sag on the optical performances of the scanning optical system in the sub-scanning direction, and to suppress a wave aberration deterioration of the scanning optical system.

Furthermore, according to the embodiments described above, it is possible to suppress the wave optical aberration in the main scanning direction and the sub-scanning direction independently of each other.

Moreover, according to the embodiments described above, it is possible to obtain a high performance of the scanning optical system.

Furthermore, according to the embodiments described above, it is possible to ensure the correction of the field curvature of the light spot on the scan target surface as much as possible and ensure maximum constant velocity characteristics.

Moreover, according to the embodiments described above, it also possible to ensure high optical performances even if accuracy is irregular within a range of the tolerance.

Furthermore, according to the embodiments described above, it is possible to reduce the change following the image height of the sub-scanning field curvature of the scanning optical system, and suppress a beam west position in the sub-scanning direction from being greatly changed relative to the scan target surface according to the image height.

Moreover, according to the embodiments described above, it is possible to distribute the positive power of the lens to the respective surfaces of the lens.

Furthermore, according to the embodiments described above, it is possible to optically write information at high rate.

Moreover, according to the embodiments described above, it is possible to realize the scanning optical system strong against the face tangle error of the optical deflector for laser scanning.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A scanning-optical system that converges, with a single lens, a divergent luminous flux, which is deflected in a main scanning direction by an optical deflector, on a surface of a scan target, the scanning optical system comprising:
   a lens configured to have two surfaces in a biconvex shape in both the main scanning direction and a sub-scanning direction, wherein
   the surfaces are anamorphic surfaces,
   at least one of the surfaces of the lens configured to have two surfaces in a biconvex shape in both the main scanning direction and a sub-scanning direction is a toric surface in which a line that connects, on a cross section in the main scanning direction, centers of curvature in a cross section in the sub-scanning direction is nonlinear, and
   a change of the curvature of the toric surface in the cross section in the sub-scanning direction along the main scanning direction is asymmetric with an optical axis of the lens.

2. The scanning optical system according to claim 1, wherein
   at least one surface of the surfaces is a constant curvature surface in which curvature in the cross section in the sub-scanning direction is constant along the main scanning direction.

3. The scanning optical system according to claim 1, wherein the scanning optical system is configured to have a function of optically scanning the surface of the scan target at a substantially constant velocity in the main scanning direction by the light spot, and a function of correcting a face tangle error of the optical deflector for laser scanning in the sub-scanning direction.

4. The scanning optical system according to claim 1, wherein a material of the lens includes resin.

5. The scanning optical system according to claim 1, wherein an optical axis of the lens is tilted with respect to a normal of the surface of the scan target.

6. The scanning optical system according to claim 1, wherein a plurality of beams that are simultaneously deflected are converged on the surface of the scan target as a plurality of light spots separated in the sub-scanning direction.

7. A single-beam optical scanner comprising:
   a light source configured to emit a luminous flux;
   a coupling lens configured to couple the luminous flux with a subsequent optical system;
   an optical deflector configured to deflect the luminous flux at a constant angular velocity;
   a line imaging optical system configured to receive coupled luminous flux from the coupling lens and to image the received coupled luminous flux near a reflective surface of the optical deflector as a line image that is long in a main scanning direction; and
   the scanning optical system according to claim 1.

8. A scanning optical system that converges, with a single lens, a divergent luminous flux, which is deflected in a main scanning direction by an optical deflector, on a surface of a scan target, the scanning optical system comprising
   a lens configured to have two surfaces in a biconvex shape in both the main scanning direction and a sub-scanning direction,
   wherein the surfaces are anamorphic surfaces,
   wherein a change of the curvature of one of the surfaces, in a cross section in the sub-scanning direction along the main scanning direction, is asymmetric with respect to an optical axis of the lens, and
   wherein the scanning optical system satisfies $4.5 < L/d0 < 7.5$, where a distance from a reflection point on a reflective surface of the optical deflector to an incident surface of the lens is d0 and a distance from an emission surface of the lens to the surface of the scan target is L.

9. A scanning optical system that converges, with a single lens, a divergent luminous flux, which is deflected in a main scanning direction by an optical deflector, on a surface of a scan target, the scanning optical system comprising
   a lens configured to have two surfaces in a biconvex shape in both the main scanning direction and a sub-scanning direction,
   wherein the surfaces are anamorphic surfaces,
   wherein a change of the curvature of one of the surfaces, in a cross section in the sub-scanning direction along the main scanning direction, is asymmetric with respect to an optical axis of the lens, and
   wherein the scanning optical system according to claim 1, wherein the scanning optical system satisfies $|R1| > |R2|$ and $|r1| > |r2|$, where a radius of curvature of a first surface of the lens in the main scanning direction is R1, a radius of curvature of a second surface of the lens in the main scanning direction is R2, a radius of curvature of the first surface in the sub-scanning direction is r1, and a radius of curvature of the second surface in the sub-scanning direction is r2.

10. A scanning optical system that converges, with a single lens, a divergent luminous flux, which is deflected in a main scanning direction by an optical deflector, on a surface of a scan target, the scanning optical system comprising
   a lens configured to have two surfaces in a biconvex shape in both the main scanning direction and a sub-scanning direction,
   wherein the surfaces are anamorphic surfaces,
   wherein a change of the curvature of one of the surfaces, in a cross section in the sub-scanning direction along the main scanning direction, is asymmetric with respect to an optical axis of the lens, and wherein the scanning optical system satisfies Fs/W<0.005, where an effective write width is W and a width of a sub-scanning field curvature within the effective write width is Fs.

11. An image forming apparatus comprising:

a photosensitive image carrier;

an optical scanner configured to optically scan the photosensitive image carrier to form a latent image; and a development unit configured to develop the latent image, wherein the optical scanner comprises, a light source configured to emit a luminous flux;

a coupling lens configured to couple the luminous flux with a subsequent optical system;

an optical deflector configured to deflect the luminous flux at a constant angular velocity;

a line imaging optical system configured to receive coupled luminous flux from the coupling lens and to image the received coupled luminous flux near a reflective surface of the optical deflector as a line image that is long in a main scanning direction; and a scanning-optical system that converges, with a single lens, a divergent luminous flux, which is deflected in a main scanning direction by an optical deflector, on a surface of a scan target, the scanning optical system comprising, a lens configured to have two surfaces in a biconvex shape in both the main scanning direction and a sub-scanning direction, wherein the surfaces are anamorphic surfaces, at least one of the surfaces of the lens configured to have two surfaces in a biconvex shape in both the main scanning direction and a sub-scanning direction is a toric surface in which a line that connects, on a cross section in the main scanning direction, centers of curvature in a cross section in the sub-scanning direction is nonlinear, and a change of the curvature of the toric surface in the cross section in the sub-scanning direction along the main scanning direction is asymmetric with an optical axis of the lens.

12. A color image forming apparatus comprising:

a plurality of photosensitive image carriers;

an optical scanner configured to optically scan the photosensitive image carrier to form at least one latent image corresponding to each color; and a development unit configured to develop the latent image, wherein the optical scanner comprises, a light source configured to emit a luminous flux;

a coupling lens configured to couple the luminous flux with a subsequent optical system;

an optical deflector configured to deflect the luminous flux at a constant angular velocity;

a line imaging optical system configured to receive coupled luminous flux from the coupling lens and to image the received coupled luminous flux near a reflective surface of the optical deflector as a line image that is long in a main scanning direction; and a scanning-optical system that converges, with a single lens, a divergent luminous flux, which is deflected in a main scanning direction by an optical deflector, on a surface of a scan target, the scanning optical system comprising, a lens configured to have two surfaces in a biconvex shape in both the main scanning direction and a sub-scanning direction, wherein the surfaces are anamorphic surfaces, at least one of the surfaces of the lens configured to have two surfaces in a biconvex shape in both the main scanning direction and a sub-scanning direction is a toric surface in which a line that connects, on a cross section in the main scanning direction, centers of curvature in a cross section in the sub-scanning direction is nonlinear, and a change of the curvature of the toric surface in the cross section in the sub-scanning direction along the main scanning direction is asymmetric with an optical axis of the lens.

* * * * *